US007577251B2

United States Patent
(12) United States Patent
Kawada et al.

(10) Patent No.: US 7,577,251 B2
(45) Date of Patent: *Aug. 18, 2009

(54) DATA PLAYER, DIGITAL CONTENTS PLAYER, PLAYBACK SYSTEM, DATA EMBEDDING APPARATUS, AND EMBEDDED DATA DETECTION APPARATUS

(75) Inventors: Hirotsugu Kawada, Osaka (JP); Noboru Katta, Hyogo (JP); Susumu Ibaraki, Osaka (JP); Makoto Tatebayashi, Hyogo (JP); Shunji Harada, Osaka (JP)

(73) Assignee: Panasonic Corporation, Osaka (JP)

(*) Notice: Subject to any disclaimer, the term of this patent is extended or adjusted under 35 U.S.C. 154(b) by 450 days.

This patent is subject to a terminal disclaimer.

(21) Appl. No.: 11/512,372

(22) Filed: Aug. 30, 2006

(65) Prior Publication Data

US 2006/0291652 A1 Dec. 28, 2006

Related U.S. Application Data

(62) Division of application No. 09/640,783, filed on Aug. 18, 2000, now Pat. No. 7,120,251.

(30) Foreign Application Priority Data

Aug. 20, 1999 (JP) ................................ 11-233813
Aug. 20, 1999 (JP) ................................ 11-233814
Aug. 20, 1999 (JP) ................................ 11-233815

(51) Int. Cl.
*H04N 7/167* (2006.01)

(52) U.S. Cl. ...................................................... 380/201

(58) Field of Classification Search ......... 380/200–203, 380/227–230; 713/169, 193, 189, 171
See application file for complete search history.

(56) References Cited

U.S. PATENT DOCUMENTS 5,604,801 A * 2/1997 Dolan et al. ................ 713/159
5,646,993 A * 7/1997 Aizawa ....................... 705/57
5,796,826 A 8/1998 Park (Continued)

FOREIGN PATENT DOCUMENTS

JP 9-97216 4/1997

(Continued)

*Primary Examiner*—Beemnet W Dada
(74) *Attorney, Agent, or Firm*—Wenderoth, Lind & Ponack, L.L.P.

(57) ABSTRACT

A data player for reading contents encrypted by a decoding key from a digital medium, and playing the encrypted contents by using the decoding key which is stored in a key storage unit, comprises: a key obtaining unit for performing mutual authentication with the key storage unit to obtain the decoding key stored in the key storage unit; a key holding unit for holding the decoding key; a playback state obtaining unit for monitoring the playback state of the digital medium; and a contents decoding unit for decoding the encrypted contents by using the decoding key. The decoding key is obtained by the key obtaining unit and stored in the key holding unit, and the encrypted contents read from the digital medium is decoded with the decoding key by the contents decoding unit to play the contents. The decoding key stored in the key holding unit is discarded according to the playback state of the digital medium which is obtained by the playback state obtaining unit.

4 Claims, 15 Drawing Sheets

Start
Receive contents playback command from user S100
Player is eligible for playback? S101
NO
Stop transmission of contents key decoding key S103
YES
Receive authentication of right for playback S102
Obtain contents key decoding key S104
Obtain contents key S105
Obtain plaintext contents from encrypted contents S106
Play plaintext contents S107
Playback state is "STOP STATE"? S108
YES
NO
Discard contents key decoding key S109
End S110
User operation? S111
NO
YES
Operate according to user operation S112

U.S. PATENT DOCUMENTS 5,799,083 A 8/1998 Brothers et al.
6,083,667 A * 7/2000 Nishizawa et al. .......... 430/321
6,088,455 A * 7/2000 Logan et al. ................ 380/200
6,266,299 B1 * 7/2001 Oshima et al. ........... 369/13.38
6,289,102 B1 * 9/2001 Ueda et al. .................. 380/201
6,314,518 B1 11/2001 Linnartz
6,347,846 B1 * 2/2002 Nakamura .................. 380/203
6,463,152 B1 * 10/2002 Takahashi ................... 380/201
6,684,199 B1 * 1/2004 Stebbings .................... 705/57

FOREIGN PATENT DOCUMENTS

JP 2000-50193 2/2000

* cited by examiner key storage unit
10
controller
11
contents key decoding key
key storage12
20
21
22
100
DVD player
101
controller
108
user operation input unit
102
contents key decoding key holder
103
encrypted contents key decoder
104
reading unit
encrypted contents key
encrypted contents
105
encrypted contents decoder
106
playback unit
playback state
107
signal output unit DVD player
100
user operation input unit
108
controller
101
playback unit
106
contents key decoding key holder
102
encrypted contents key decoder
103
encrypted contents decoder
105
reading unit
104
(unauthenticated)
key storage unit Ma
10a
controller
11a
contents key decoding key KKa
12a
Da23
24
25
key storage unit Mb
10b
controller
11b
contents key decoding key KKa
12a
Db26
27
28

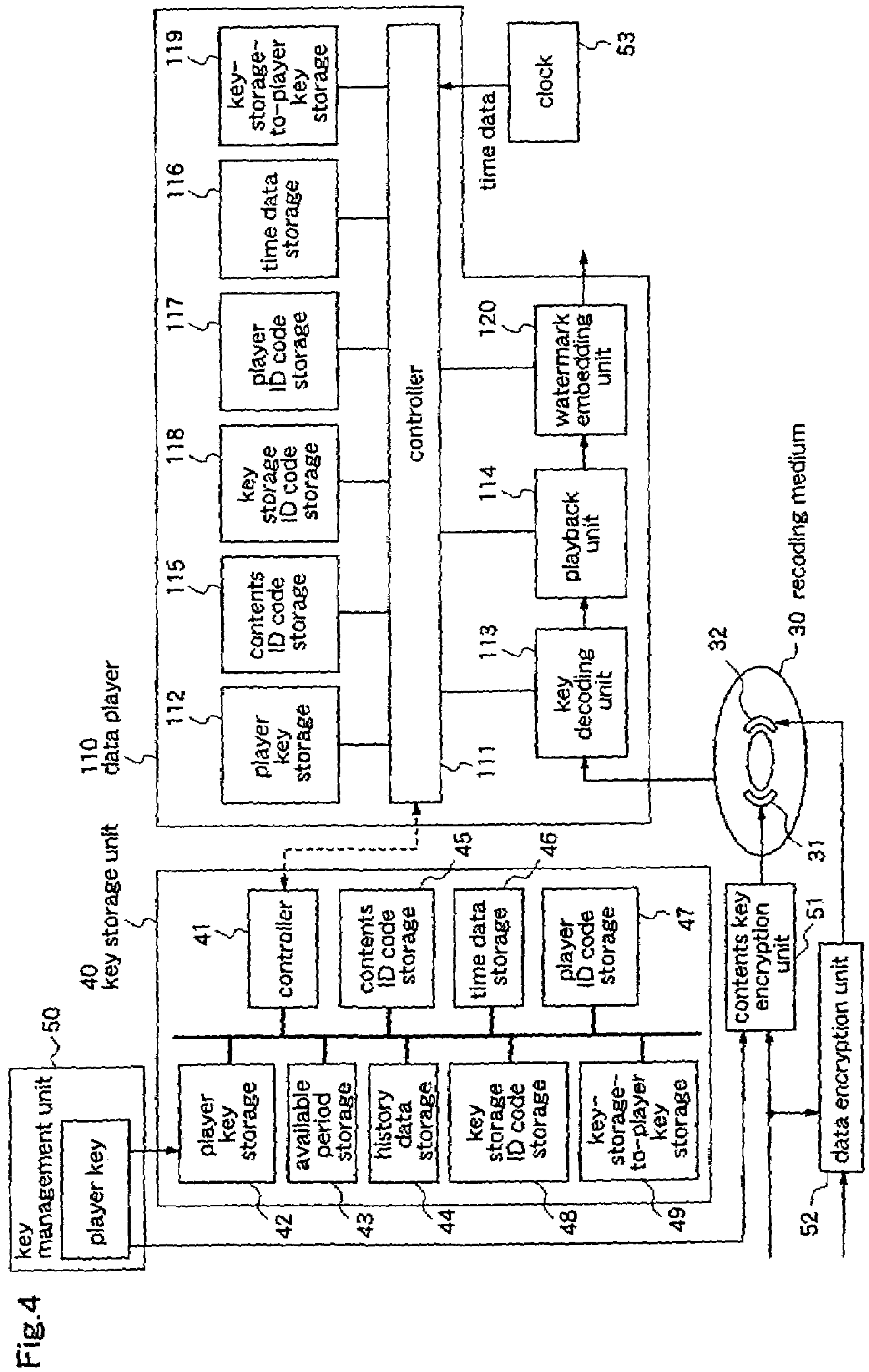
Fig.4
key management unit
50
player key
40
key storage unit
41
controller
45
contents ID code storage
46
time data storage
47
player ID code storage
player key storage
42
available period storage
43
history data storage
44
key storage ID code storage
48
key-storage-to-player key storage
49
110
data player
111
controller
112
player key storage
115
contents ID code storage
118
key storage ID code storage
117
player ID code storage
116
time data storage
119
key-storage-to-player key storage
113
key decoding unit
114
playback unit
120
watermark embedding unit
time data
clock
53
30
recoding medium
31
32
contents key encryption unit
51
data encryption unit
52

Fig.6

| | | | |
|---|---|---|---|
| key available time | | | hash value 1 |
| key nonuse period | key available time | start time 1 | hash value 2 |
| start time 1 | player ID code 1 | contents ID code 1 | hash value 3 |
| end time 1 | player ID code 1 | contents ID code 1 | hash value 4 |
| key nonuse period | end time 1 | start time 2 | hash value 5 |
| start time 2 | player ID code 2 | contents ID code 2 | hash value 6 |
| end time 2 | player ID code 2 | contents ID code 2 | hash value 7 |

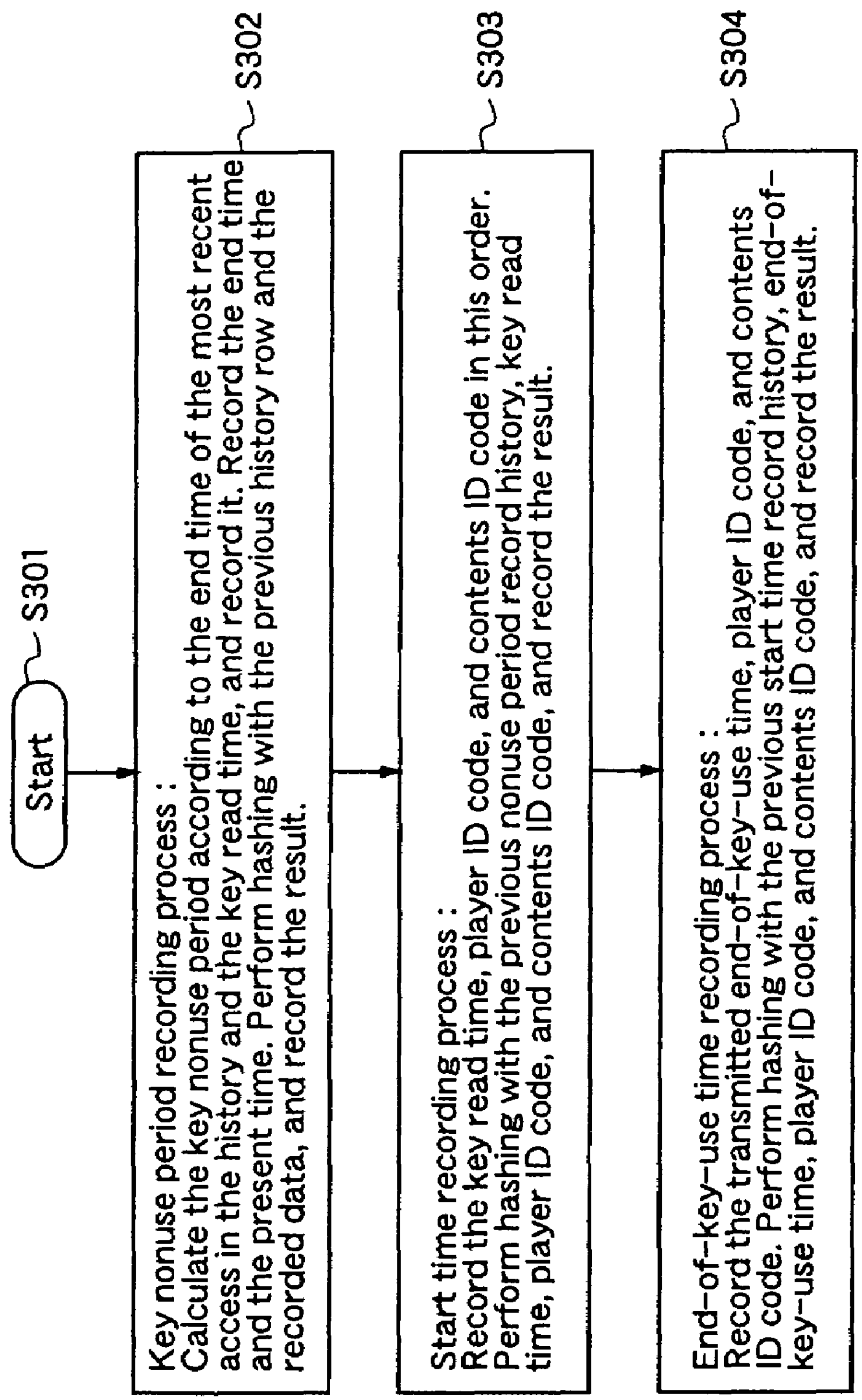
Fig.7
Start
S301
S302
Key nonuse period recording process :
Calculate the key nonuse period according to the end time of the most recent access in the history and the key read time, and record it. Record the end time and the present time. Perform hashing with the previous history row and the recorded data, and record the result.
S303
Start time recording process :
Record the key read time, player ID code, and contents ID code in this order. Perform hashing with the previous nonuse period record history, key read time, player ID code, and contents ID code, and record the result.
S304
End-of-key-use time recording process :
Record the transmitted end-of-key-use time, player ID code, and contents ID code. Perform hashing with the previous start time record history, end-of-key-use time, player ID code, and contents ID code, and record the result.

pattern to be embedded
sequence-to-be-embedded generator
121
122
WM embedding unit
video data
video data with watermark
123
short-period embedded pattern detector
124
long-period embedded pattern detector
125
WM detector
original image
video data with watermark

Fig.9 pattern to be embedded

| 6 | 5 | C | a |
|---|---|---|---|
| 0110 | 0101 | 1100 | 1010 |

| frame number | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | 6 | 5 | C | a | 0 | 0 | 0 | 0 | 6 | 5 | C | a | F | F | F | F |

| 17 | 18 | 19 | 20 | 21 | 22 | 23 | 24 | 25 | 26 | 27 | 28 | 29 | 30 | 31 | 32 | |
|---|---|---|---|---|---|---|---|---|---|---|---|---|---|---|---|---|
| 6 | 5 | C | a | F | F | F | F | 6 | 5 | C | a | 0 | 0 | 0 | 0 | ...... |

60
illegal copy
131
WM detection
132
retrieve/verification according to player ID code
133
retrieve/verification according to key storage ID code
134
retrieve/verification according to key read time data
Specify illegal player, illegal key storage unit, and time 207 data player
220
data embedding means
real position data
real time data
ID data
231
decoding means
key
timing data
control means
211
240
stream output unit
271
transmission means
real position measuring means
222
real time measuring means
221
key output means
272
270
control data transmission unit

DATA PLAYER, DIGITAL CONTENTS PLAYER, PLAYBACK SYSTEM, DATA EMBEDDING APPARATUS, AND EMBEDDED DATA DETECTION APPARATUS

This application is a divisional of U.S. application Ser. No. 09/640,783, filed Aug. 18, 2000 now U.S. Pat. No. 7,120,251.

FIELD OF THE INVENTION

The present invention relates to a data player, a playback system, a data embedding apparatus, and an embedded data detection apparatus, which are able to detect or prevent illegal use of contents of digital media when the-contents are copyrighted.

BACKGROUND OF THE INVENTION

A digital versatile disk player (DVD player) is an example of a conventional data player. In a DVD player, data written on a disk (DVD) is encrypted so that a player which does not adopt means for copyright protection cannot play the data on the disk and, therefore, only a player which is legally provided with a key can play the disk. Generally, the key required for playback is given to each DVD player.

Hereinafter, an example of a conventional data player will be described with reference to FIG. 18.

FIG. 18 is a block diagram illustrating an example of a conventional data player.

In FIG. 18, reference numeral 1000 designates a key storage unit which stores a contents key for decoding encrypted contents 1202 recorded on a digital medium 1200, and reference numeral 1100 designates a data player. The key storage unit 1000 comprises a controller 1001 and a key storage 1002 which stores the contents key. The data player comprises a controller 1101, a contents key holder 1102 which takes the contents key from the key storage unit 1000 and holds it, a reader 1104 which reads the encrypted contents 1202 from the digital medium 1200, an encrypted contents decoder 1105 which decodes the encrypted contents 1202, a player 1106 which plays the decoded contents, a signal output unit 1107 which outputs the contents to the outside, and a user operation input unit 1108 which transmits an instruction from the user to the controller 1101.

Hereinafter, a description will be given of the operation of the data player 1100 in the case where the user instructs the data player 1100 to play the contents of the digital medium 1200, through the user operation input unit 1108.

Before playing the encrypted contents 1202, the data player 1100 communicates with the controller 1001 of the key storage unit 1000 using the controller 1101, and proves that it is eligible to play the encrypted contents 1202 in the digital medium 1200. When the controller 1001 of the key storage unit 1000 confirms that the data player 1100 is eligible for playback, the data player 1100 receives the contents key from the key storage unit 1000 and stores it in the contents key holder 1102. Thereafter, the reader 1104 reads the encrypted contents 1202 from the digital medium 1200, and the decoder 1105 decodes the encrypted contents 1202 using the contents key which has been stored, thereby obtaining plaintext contents. The plaintext contents are played by the player 1106 and then outputted as a signal by the signal output unit 1107. In this construction, when performing playback of specific encrypted contents existing on a digital medium, the data player 1100 is confirmed by the key storage unit 1000 as to whether it is eligible for playing the encrypted contents or not. Thereby, the encrypted contents on the digital medium are prevented from being played by an illegal player which is not eligible for playback.

On the other hand, with respect to electronic distribution of movies to theaters or video services in airplanes, there are some movies which have not yet been released in theaters and, therefore, it is desired that the periods during which these movies can be played are controllable. As a system for accessing such data, Japanese Published Patent Application No. Hei. 10-341212 discloses an encryption text transmission system. In this system, a key is provided with data about its available period or place, and the present time or position is detected when using the key, whereby the use of the key can be controlled according to whether the present time is within the available period or whether the present position where the key is used is within the available place. Further, the use of the key can be controlled by periodically recording time data and comparing the time data with the present time.

Further, it has been proposed that, when playing data, the ID number of a player which plays the data is embedded in the played data. Thereby, if the played data is illegally copied and sold, a player which assisted the illegal act can be identified.

In the conventional data player, however, once a data player is recognized as being eligible for playing specific contents by the key storage unit and then obtains a contents key and stores it in the contents key storage, the player can illegally play other encrypted contents by using the stored contents key even when the player is not eligible to play the contents.

Further, in the method disclosed in Japanese Published Patent Application No. Hei. 10-341212, since the time data or position data is judged after transmitting the key to the player end, there is a risk that the key is obtained illegally. Further, there is a risk that the recorded time data is altered and the key is obtained illegally.

Furthermore, in the case where the data such as the player's ID number is embedded in the played data, the embedded data must be detected correctly. However, when the number of embedded data increases, it is difficult to detect all of them correctly and, further, there is no means to confirm whether the result of detection is correct or not.

SUMMARY OF THE INVENTION

The present invention is made to solve the above-described problems and has for its object to provide a data player, a digital contents player, a playback system, a data embedding apparatus, and an embedded data detection apparatus, for preventing illegal access by a player having no access right or illegal playback of data by illegally controlling time data, and for detecting or preventing illegal use of copyrighted data, such as illegal copying.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a data player for reading contents encrypted by a decoding key from a digital medium, and playing the encrypted contents by using the decoding key which is stored in a key storage unit. This data player comprises key obtaining means for performing mutual authentication with the key storage unit to obtain the decoding key stored in the key storage unit; key holding means for holding the decoding key; playback state obtaining means for monitoring the playback state of the digital medium; and contents decoding means for decoding the encrypted contents by using the decoding key. The decoding key is obtained by the key obtaining means and stored in the key holding means, the encrypted contents read from the digital medium is decoded with the decoding key by the contents decoding means to play the contents, and the decoding key stored in the key holding means is discarded according to the playback state of the digital medium which is obtained by the playback state obtaining means. Therefore, illegal use of the key is avoided, whereby illegal playback of the contents by an ineligible player is avoided.

According to a second aspect of the present invention, in the data player of the first aspect, the decoding key stored in the key holding means is discarded when it is confirmed that the playback state of the digital medium has become "STOP STATE". Since the playback state of the player is always monitored and the key is discarded when the playback state has become "STOP STATE", illegal use of the key is avoided.

According to a third aspect of the present invention, in the data player of the first or second aspect, the digital medium is a DVD. Therefore, illegal playback of the contents in the DVD by an ineligible player is avoided.

According to a fourth aspect of the present invention, there is provided a data player for reading contents encrypted by a contents key and the contents key encrypted by a decoding key, from a digital medium, and playing the encrypted contents by using the decoding key which is stored in a key storage unit. This data player comprises key obtaining means for performing mutual authentication with the key storage unit to obtain the decoding key stored in the key storage unit; key holding means for holding the decoding key; playback state obtaining means for monitoring the playback state of the digital medium; encrypted contents key decoding means for decoding the encrypted contents key by using the decoding key to obtain the contents key; and encrypted contents decoding means for decoding the encrypted contents by using the contents key. The decoding key is obtained by the key obtaining means and stored in the key holding unit, the encrypted contents key read from the digital medium is decoded with the decoding key by the contents key decoding means to obtain the contents key, the encrypted contents read from the digital medium is decoded by using the contents key to play the contents, and the decoding key stored in the key holding means is discarded according to the playback state of the digital media which is obtained by the playback state obtaining means. Therefore, illegal use of the key is avoided, whereby illegal playback of the contents by an ineligible player is avoided.

According to a fifth aspect of the present invention, in the data player of the fourth aspect, the decoding key stored in the key holding means is discarded when it is confirmed that the playback state of the digital medium has become "STOP STATE". Since the playback state of the player is always monitored and the key is discarded when the playback state has become "STOP STATE", illegal use of the key is avoided.

According to a sixth aspect of the present invention, in the data player of the fourth or fifth aspect, the digital medium is a DVD. Therefore, illegal playback of the contents in the DVD by an ineligible player is avoided.

According to a seventh aspect of the present invention, there is provided a key storage device comprising decoding key storage means for storing a decoding key for decoding encrypted data recorded on a digital medium; key read authorization means for authorizing an external device to read the decoding key when the external device plays the encrypted data; and key read history recording means for recording the readout record of the decoding key to the external device. The decoding key includes available period data which is the available period for reading the decoding key, and the key read authorization means receives a key request signal including a key read time which is the time when the external device made a request to read the decoding key, and authorizes the external device to read the decoding key after confirming that the key read time is later than the latest time amongst the read history data of the decoding key which is stored in the key read history storage means, and that the key request time is within the key read available period, and that the key read history data has been recorded by the key read history recording means. Therefore, an illegality relating to the key with the available period, such as setting back the time to be declared, is avoided, whereby illegal reception of the key is avoided.

According to an eighth aspect of the present invention, in the key storage device of the seventh aspect, the key read history recording unit generates and records, in addition to the key read history data, an alteration detection code by which alteration on the key read history data can be detected. Therefore, alteration of the key read history data is made difficult.

According to a ninth aspect of the present invention, in the key storage device of the seventh or eighth aspect, the key read authorization means authorizes the external device to read the decoding key after confirming that the key read history data is not altered, from the alteration detection code added to the key read history data. Therefore, illegal use of the key by altering the key read history data is avoided.

According to a tenth aspect of the present invention, in the key storage device of the seventh aspect, the key read history recording means has a predetermined storage capacity, and the key read authorization means does not authorize the external device to read the decoding key when the key read history data has reached the storage capacity of the key read history recording means. Therefore, an upper bound is set in access to the key, whereby the number of times the key is illegally used is limited.

According to an eleventh aspect of the present invention, there is provided a data player for reading data encrypted by a decoding key from a digital medium, and playing the data. This data player comprises key obtaining means for obtaining the decoding key for decoding the encrypted data, from a key storage unit which stores the decoding key; decoding means for decoding the encrypted data obtained from the digital medium, by using the decoding key; data embedding means for embedding data in the data decoded by the decoding means; and device ID code storage means for storing the device ID code of this data player. The decoding key is obtained by the key obtaining means, and a key read time at which a request to read the decoding key was made and the device ID code of the data player are embedded in the decoded data by the data embedding means. Therefore, the key read time data and the device ID code of the data player, which are embedded in the decoded data, can be used to specify an illegal user.

According to a twelfth aspect of the present invention, in the data player of the eleventh aspect, the key obtaining means reads the ID code of the key storage unit which stores the decoding key, together with the decoding key, from the key storage unit, and the data embedding means further embeds the ID code of the key storage unit in the decoded data. Since the ID code of the key storage unit is also embedded in the decoded data, the data for specifying the illegal user is increased.

According to a thirteenth aspect of the present invention, in the data player of the eleventh or twelfth aspect, the data embedding means comprises sequence generation means for converting a pattern to be embedded into a sequence to be embedded in each video frame, and embedding means for embedding the sequence in each video frame by watermarking. The sequence generation means converts the pattern to be embedded into the sequence to be embedded such that short-period patterns and a long-period pattern are mixed in the sequence, the short-period patterns are obtained by dividing the pattern to be embedded according to the number of bits to be embedded in each frame and embedding the bits in each frame, and the long-period pattern is obtained by dividing the pattern to be embedded, bit by bit, and embedding the divided bits over plural frames which are plural times as many as the number into which the pattern to be embedded is divided. Therefore, the key read time data or the ID code of the key storage unit is converted into a bit sequence which is resistive to alteration and then embedded in the decoded data, and the embedded data can be used to specify an illegal user.

According to a fourteenth aspect of the present invention, in the data player of the thirteenth aspect, the key obtaining means generates a key read history signal including the key read time and the device ID code of this data player, and transmits this signal to the key storage unit which stores the decoding key. Therefore, key read history data including the same data as the embedded data is formed.

According to a fifteenth aspect of the present invention, there is provided a digital contents player for reading data encrypted by a decoding key from a digital medium, and playing the data. This digital contents player comprises key storage means for storing the decoding key for decoding the encrypted data; and data playback means for reading the decoding key from the key storage means, and playing the data using the decoding key. The data playback means and the key storage means are removable from each other. When the data playback means reads the decoding key, the key storage means records key read history data including a device ID code of this digital contents player and a key read time when a request to read the decoding key was made. The data playback means embeds the key read time and the device ID code in the data played with the decoding key. Therefore, the key read time data and the device ID code of the digital contents player can be embedded in the decoded data.

According to a sixteenth aspect of the present invention, in the digital contents player of the fifteenth aspect, the data to be embedded is converted into a sequence to be embedded in each video frame, and then embedded by watermarking. The sequence to be embedded is a mixture of short-period patterns and a long-period pattern, and the short-period patterns are obtained by dividing the pattern to be embedded according to the number of bits to be embedded in each frame and embedding the bits in each frame, and the long-period pattern is obtained by dividing the pattern to be embedded, bit by bit, and embedding the divided bits over plural frames which are plural times as many as the number into which the pattern to be embedded is divided. Therefore, the key read time data or the device ID code of the digital contents player is converted into a bit sequence resistive to alteration, and embedded in the decoded data.

According to a seventeenth aspect of the present invention, there is provided a key read history recording method comprising: recording available period data which is the available period for reading a decoding key for decoding encrypted data; recording, as a key nonuse period, a difference between a key read time when a request to read the decoding key was made and a time which has been recorded at a time that is previous and nearest to the key read time; recording key read history data including the key read time and the device ID code of a data player; and recording the time when use of the decoding key has ended, as an end-of-key-use time. Therefore, the time data is prevented from going backward, whereby illegal use of the key is avoided.

According to an eighteenth aspect of the present invention, there is provided a data embedding apparatus comprising sequence generation means for converting a pattern to be embedded into a sequence to be embedded in each video frame, and embedding means for embedding the sequence in each video frame by watermarking. The sequence generation means converts the pattern to be embedded into the sequence to be embedded in which short-period patterns and a long-period pattern are mixed, the short-period patterns are obtained by dividing the pattern to be embedded according to the number of bits to be embedded in each frame and embedding the bits in each frame, and the long-period pattern is obtained by dividing the pattern to be embedded, bit by bit, and embedding the divided values over plural frames which are plural times as many as the number into which the pattern to be embedded is divided. Therefore, a data embedding apparatus which can form a pattern to be embedded, which is resistive to alteration, is realized.

According to a nineteenth aspect of the present invention, there is provided a data embedding apparatus comprising real time measuring means for outputting real time data which specifies the present time, and data embedding means for embedding the real time data in video/audio data. Therefore, the video/audio signal which can specify the time data is output, and an illegal user can be specified according to the time data.

According to a twentieth aspect of the present invention, in the data embedding apparatus of the nineteenth aspect, the data embedding means embeds the real time data at the time when the video/audio data is input to this apparatus, in the video/audio data which is input in the visible/audible state to this apparatus. Therefore, the video/audio data which can specify the time data at the time when an illegality was performed is output, and the illegal user can be specified according to the time data.

According to a twenty-first aspect of the present invention, there is provided a data embedding apparatus comprising real position measuring means for outputting real position data which specifies the present physical position, and data embedding means for embedding the real position data in video/audio data. Therefore, the video/audio signal which can specify the position data is output, and an illegal user can be specified according to the position data.

According to a twenty-second aspect of the present invention, in the data embedding apparatus of the twenty-first aspect, the data embedding means embeds the real position data at the time when the video/audio data is input to this apparatus, in the video/audio data which is input in the visible/audible state to this apparatus. Therefore, the video/audio signal which can specify the position data at the time when an illegality was performed is output, and the illegal user can be specified according to the position data.

According to a twenty-third aspect of the present invention, there is provided a data embedding method comprising a real time measuring step of outputting real time data which specifies the present time, and a data embedding step of embedding the real time data in video/audio data. Therefore, the video/audio signal which can specify the time data is output, and an illegal user can be specified according to the time data.

According to a twenty-fourth aspect of the present invention, in the data embedding method of the twenty-third aspect, the real time data at the time when the video/audio data is input, is embedded in the video/audio data which is input in the visible/audible state. Therefore, the video/audio signal which can specify the time data at the time when an illegality was performed is output, and the illegal user can be specified according to the time data.

According to a twenty-fifth aspect of the present invention, there is provided a data embedding method comprising a real position measuring step of outputting real position data which specifies the present position, and a data embedding step of embedding the real position data in video/audio data. Therefore, the video/audio signal which can specify the position data is output, and an illegal user can be specified according to the position data.

According to a twenty-sixth aspect of the present invention, in the data embedding method of the twenty-fifth aspect, the real position data at the time when the video/audio data is input, is embedded in the video/audio data which is input in the visible/audible state. Therefore, the video/audio signal which can specify the position data at the time when an illegality was performed, and the illegal user can be specified according to the position data.

According to a twenty-seventh aspect of the present invention, there is provided an embedded data detection apparatus for detecting embedded data from playback data in which the data is embedded by a data embedding apparatus. The data embedding apparatus comprises sequence generation means for generating a sequence in which short-period patterns and a long-period pattern are mixed, the short-period patterns being obtained by dividing the pattern to be embedded according to the number of bits to be embedded in each frame and embedding the bits in each frame, and the long-period pattern being obtained by dividing the pattern to be embedded, bit by bit, and embedding the divided bits over plural frames which are plural times as many as the number into which the pattern to be embedded is divided; and data embedding means for embedding the sequence in each video frame by watermarking. The embedded data detection apparatus comprises intra-frame embedded data detection means for detecting the embedded pattern from each video frame; short-period embedded pattern detection means for calculating the embedded pattern from the embedded pattern detected by the intra-frame embedded data detection means, with reference to shirt-circuit embedded bits; and long-period embedded pattern detection means for calculating the embedded pattern with reference to long-period embedded bits. Therefore, this apparatus can detect the embedded data which is embedded by using the short-period patterns and the long-period pattern and is resistive to alteration.

According to a twenty-eighth aspect of the present invention, there is provided an embedded data confirming method comprising: detecting embedded data from visible/audible data in which real time data that can specify the present time, real position data that can specify the present position, or a device ID code of a device for playing the visible/audible data is embedded; and collating the detected data with a data base containing the history of the embedded data. Therefore, the detected data can be collated with the history data base, whereby an illegal user is traced with higher efficiency.

According to a thirtieth aspect of the present invention, there is provided a playback system comprising a data output unit for outputting data, and a data player. The data player comprises decoding means for decoding input data to video/audio data which is visible or audible, real time measuring means for outputting real time data which can specify the present time, and data embedding means for embedding the real time data in the video/audio data. The real time data measured by the real time measuring means at the time when the data player plays the input data is embedded in the video/audio data. Therefore, the time data at the time when an illegality was performed can be embedded in the decoded video/audio signal, and an illegal user can be specified according to the embedded time data.

According to a thirty-first aspect of the present invention, the playback system of the thirtieth aspect comprises one piece of the real time measuring means, and at least one piece of the data output unit. Therefore, in the system having plural players, the time data embedded in the video/audio signal can be used to specify an illegal user. Further, the time data is prevented from varying between the plural players, and the number of lines used for transmission is reduced.

According to a thirty-second aspect of the present invention, there is provided a playback system comprising a data output unit for outputting data, and a data player. The data player comprising decoding means for decoding input data to video/audio data which is visible or audible, real position measuring means for outputting real position data which can specify the present position, and data embedding means for embedding the real position data in the video/audio data. The real position data measured by the real position measuring means at the time when the data player plays the input data is embedded in the video/audio data. Therefore, the position data at the time when an illegality was performed can be embedded in the decoded video/audio signal, and an illegal user can be specified according to the embedded position data.

According to a thirty-third aspect of the present invention, the playback system of the thirty-second aspect comprises one piece of the real position measuring means, and at least one piece of the data output unit. Therefore, in the system having plural players, the position data embedded in the video/audio signal can be used to specify an illegal user. Further, the position data is prevented from varying between the plural players, and the number of lines used for transmission is reduced.

BRIEF DESCRIPTION OF THE DRAWINGS

FIG. 4 is a block diagram illustrating a an example of a system including a data player and a key storage unit according to a second embodiment of the present invention.

FIG. 6 is a diagram illustrating an example of written history data according to the second embodiment.

FIG. 7 is a flowchart illustrating the procedure of writing the history data according to the second embodiment.

FIG. 9 is a diagram illustrating pattern sequences to be embedded in frames, as the result of watermarking according to the second embodiment.

DETAILED DESCRIPTION OF THE PREFERRED EMBODIMENTS

Embodiment 1

Hereinafter, a first embodiment of the present invention corresponding to claims 1 to 6 will be described with reference to FIGS. 1 to 3.

Initially, the construction of a data player according to the first embodiment will be described with reference to FIG. 1.

Figure 1:
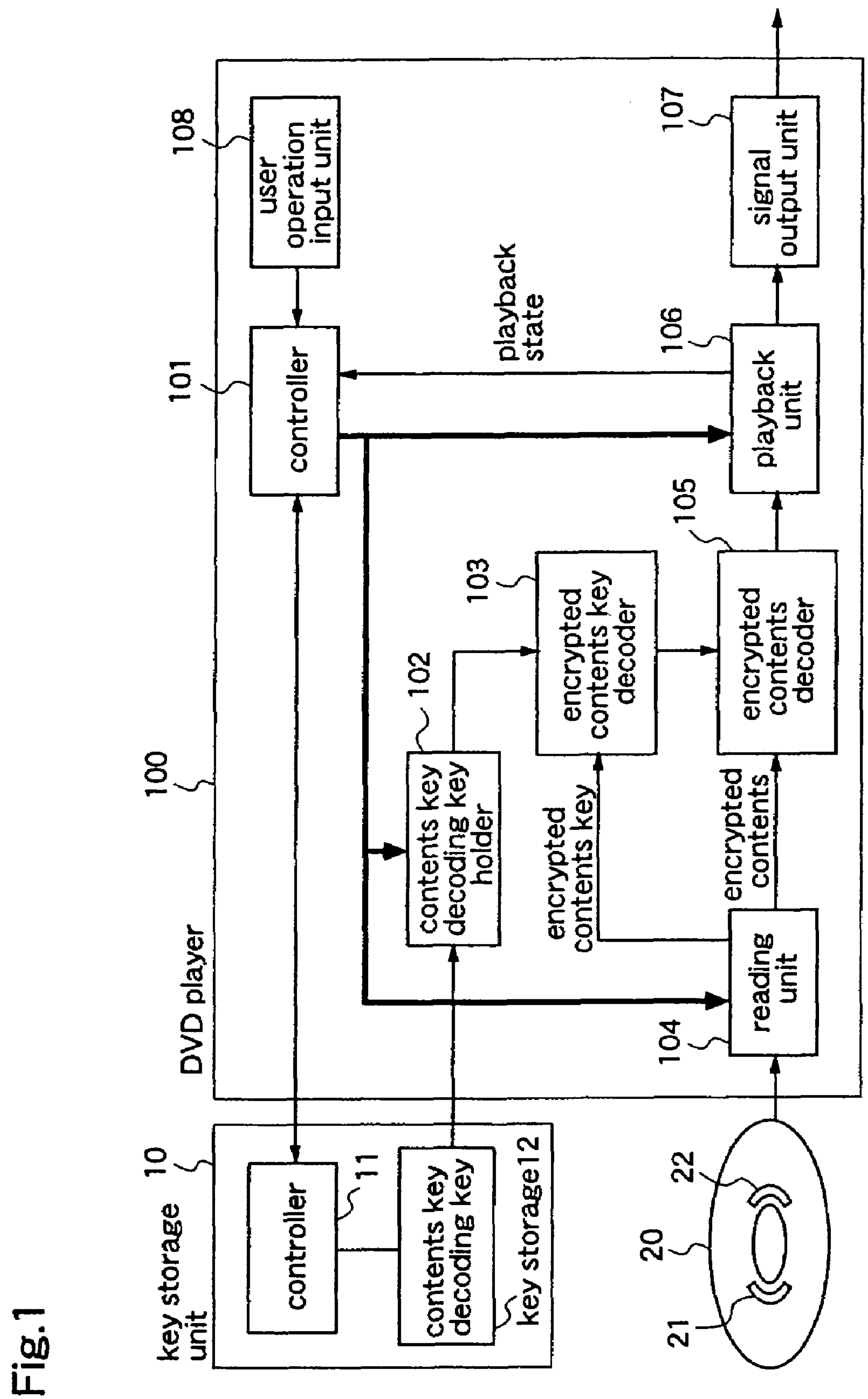
FIG. 1 is a block diagram illustrating an example of a data player according to a first embodiment of the present invention.

FIG. 1 is a block diagram illustrating an example of a data player according to the first embodiment.

In FIG. 1, reference numeral 10 designates a key storage unit, 100 designates a DVD player (data player), and 20 designates a DVD (digital medium). The key storage unit 10 comprises a controller 11 and a key storage 12 in which a contents key decoding key (decoding key) is stored. The contents key decoding key is a key for decoding an encrypted contents key 21 recorded on the DVD 20 to obtain a contents key. The controller 11 performs mutual authentication with the DVD player 100, and permits the DVD player 100 to read the contents key decoding key. The DVD player 100 comprises a controller 101 for performing mutual authentication with the key storage unit 10 to receive key read permission, a contents key decoding key holder 102 (key holder) for holding the contents key decoding key which is read from the key storage unit 10, an encrypted contents key decoder 103 for decoding the encrypted contents key, a reader 104 for reading the contents or the like from the DVD 20, an encrypted contents decoder 105 for decoding the encrypted contents, a playback unit 106 for playing the decoded data, a signal output unit 107 for outputting the data played by the playback unit 106, and a user operation input unit 108 for sending an instruction from the user to the controller 101. The DVD 20 contains the encrypted contents key 21 and the encrypted contents 22. The encrypted contents 22 recorded on the DVD 20 are obtained by encrypting plaintext contents with the contents key, and the encrypted contents key 21 is obtained by encrypting the contents key with the contents key decoding key.

Next, the playback operation of the DVD player 100 will be described with reference to FIG. 2.

Figure 2:
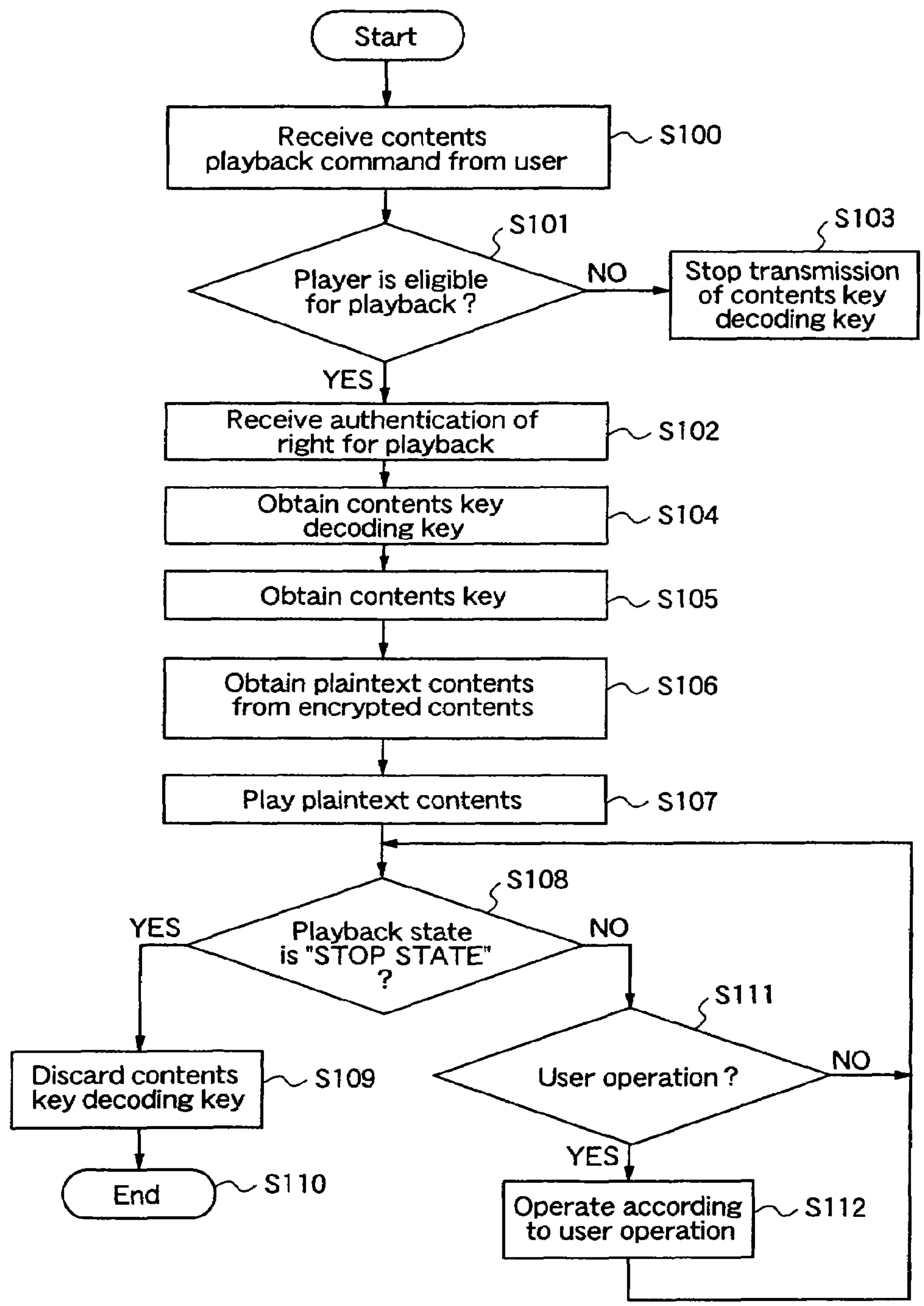
FIG. 2 is a flowchart illustrating an example of operation of the data player according to the first embodiment.

FIG. 2 is a flowchart illustrating the operation of the DVD player 100 when it plays the contents. Here, a description will be given of the case where the user instructs the DVD player 100 to play the contents on the DVD 20, through the user operation input unit 108.

Initially, when the DVD player 100 is instructed by the user through the user operation input unit 108 so as to play the contents 22 on the DVD 20 (step S100), the DVD player 100 communicates with the controller 11 of the key storage unit 10 by using the controller 101 to make mutual authentication, and is verified as to whether it is eligible to play the contents recorded in the DVD 20 or not (step S101). When the controller 11 of the key storage unit 10 verifies that the DVD player 100 is eligible for playback and permits the DVD player 100 to read the contents key decoding key stored in the key storage 12 of the key storage unit 10 (step S102), the DVD player obtains the contents key decoding key from the key storage 12 and stores it in the contents key decoding key holder 102 (step S104). On the other hand, when the controller 11 of the key storage unit 10 does not verify that the DVD player 100 is eligible for playback in step S101, the DVD player 100 is not permitted to read the contents key decoding key, and the process is halted in step S103.

The DVD player 100, which has received the contents key decoding key, obtains the encrypted contents key 21 from the DVD 20 by using the reader 104, and decodes the encrypted contents key 21 obtained from the DVD, with the contents key decoding key which has been stored in the contents key decoding key holder 102, by using the decoder 103, thereby obtaining the contents key (step S105). Next, the DVD player 100 obtains the encrypted contents 22 using the reader 104, and decodes the encrypted contents 22 with the contents key which has been decoded by the contents key decoding key, by using the decoder 105, thereby obtaining plaintext contents.

Thereafter, in step S107, the DVD player 100 plays the obtained plaintext contents by using the player 106, and outputs a signal from the signal output unit 107. While the contents in the DVD 20 are read and played by the reader 104 and the player 106 which are controlled by the controller 101, the player 106 continuously checks whether there is a change in the playback state of the DVD 20 (step S108), and when the playback state has changed, the player 106 posts the playback state to the controller 101. When the controller 101 conforms that the playback state has become "STOP STATE", the controller 101 instructs the contents key decoding key holder 102 to discard the contents key decoding key (step S109), and the consecutive operation is ended (step S110). The "STOP STATE" indicates that the operation of the DVD player 100 is in the stopped state. When it is not confirmed that the playback state has become "STOP STATE" in step 5108, the player 106 checks whether there is an instruction from the user (step S111). When there is no instruction from the user, the player 106 continues to monitor the playback state. When there is an instruction from the user, the player 106 operates according to the instruction of the user (step S112). Step 5112 is followed by step S108 to repeat the operation from checking the playback state.

In the above-described operation, the DVD player 100 must be authenticated by the controller 11 of the external key storage unit 10 as to whether it is eligible to play the contents on the DVD 20 or not, every time it starts playback of the contents on the DVD 20.

Next, a description will be given of the case where the DVD player 100 is judged as being an illegal player in the mutual authentication between the key storage unit 10*a* and the DVD player 100, with reference to FIG. 3.

Figure 3:
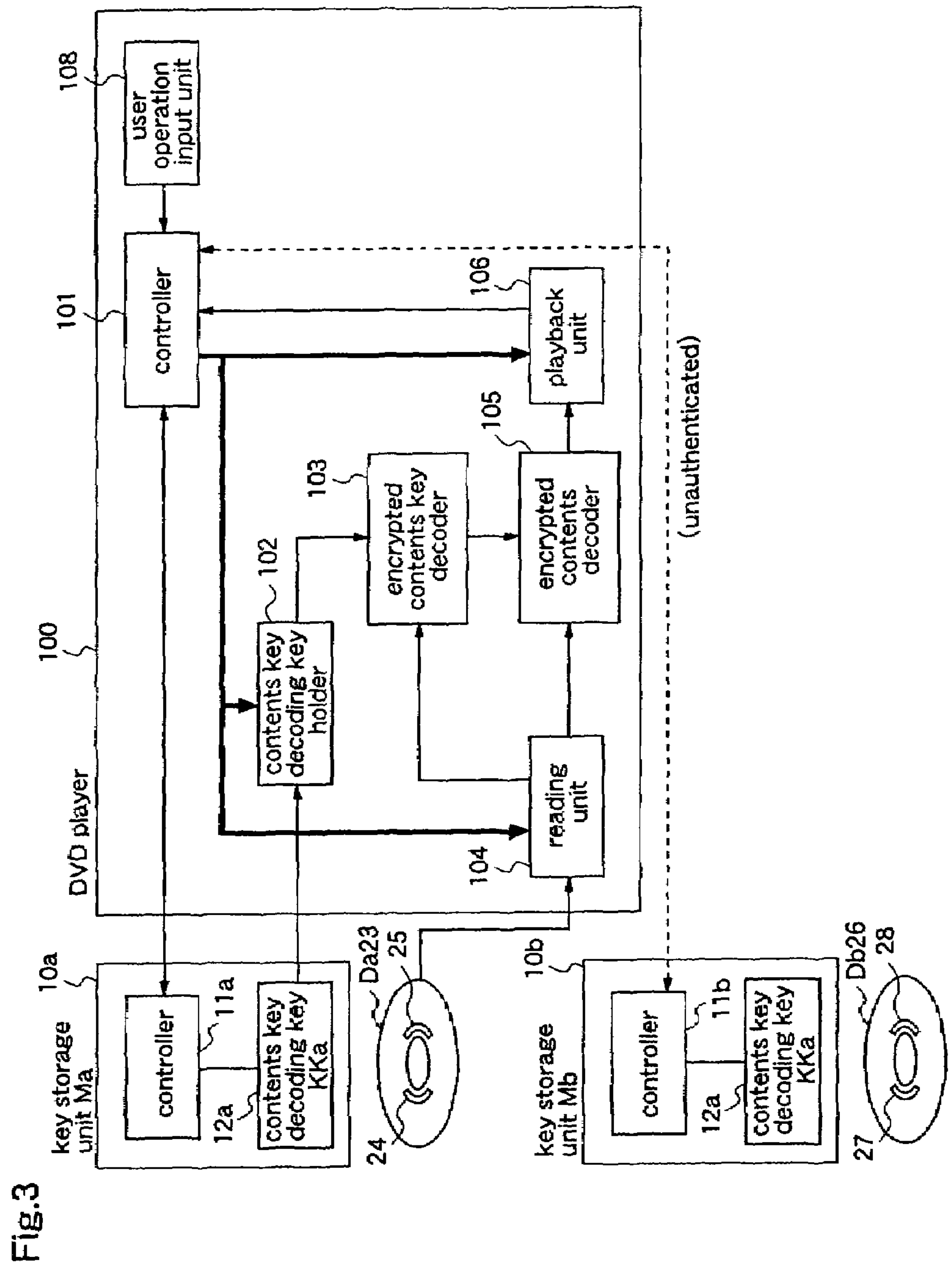
FIG. 3 is a block diagram for explaining the case where the data player according to the first embodiment is judged as an illegal one.

FIG. 3 is a block diagram illustrating key storage units, DVDs, and a DVD player in the case where the DVD player is judged as being an illegal player.

In FIG. 3, 10*b* denotes a key storage unit Mb different from the key storage unit Ma10*a*. The key storage unit Mb10*b* comprises a key storage 12*a* which contains a contents key decoding key KKa which is identical to the contents key decoding key KKa stored in the key storage unit Ma10*a*, and a controller 11*b* which performs mutual authentication with the DVD player 100 and permits the player 100 to read the contents key decoding key KKa. Further, 23 denotes a DVD Da containing an encrypted contents key 24 and encrypted contents 25, and 26 denotes a DVD Db containing contents other than those possessed by the DVD Da23. More specifically, the DVD Db26 contains contents 28 encrypted by using a contents key Kb, and an encrypted contents key 27 obtained by encrypting the contents key Kb by using the contents key decoding key KKa that is stored in the key storage 12*a* of the key storage unit Mb10*b*. In FIG. 3, the same reference numerals as those shown in FIG. 1 denote the same or corresponding units.

In the DVD player 100, two DVDs Da23 and Db26, and two key storage units Ma10*a* and Mb10*b* which are constructed as described above, the key storage unit Ma10*a* containing the contents key decoding key KKa is distributed together with the DVD Da23, and it is withdrawn at the appropriate time. The DVD player 100 plays the contents 25 in the DVD Da23 by using the DVD Da23 and the key storage unit 10*a*.

Now it is assumed that the DVD player 100 is judged as an illegal player for the reason that a pirated DVD copied with this DVD player 100 has been discovered. Further, it is assumed that the DVD Db26, which contains the contents encrypted with the contents key Kb encrypted with the contents key decoding key KKa included in the key storage unit Mb10*b*, is produced, and the contents key decoding key KKa is stored in the key storage unit Mb10*b* to be distributed together with the DVD Db26. The key storage unit Mb10*b* will be withdrawn at the appropriate time like the key storage unit Ma10*a*. The controller 11*b* in the key storage unit Mb10*b* is altered so that it can recognize the DVD player 100 as an illegal player. Thereby, the key storage unit Mb10*b* does not transmit the contents key decoding key KKa any more to the DVD player 100 which is judged as an illegal player while it transmits the key KKa to other normal DVD players (not shown) as ever.

Thus, the DVD player 100 regarded as an illegal player cannot play DVDs which will be fabricated after the DVD Db26.

As described above, according to the first embodiment, the contents key decoding key, which has been obtained from the key storage 12 of the key storage unit 10 and stored in the contents key decoding key holder 102 of the DVD player 100, is discarded when the playback state becomes "STOP STATE", and the contents key decoding key is not transmitted to the DVD player which is regarded as an illegal DVD player in mutual authentication between the key storage unit 10 and the DVD player. Thereby, the contents in the DVD is prevented from being played by the illegal DVD player.

While in this first embodiment DVDs are used as digital media containing encrypted contents, other digital media may be used.

Further, while in this first embodiment the DVD player 100 requires two keys, the contents key decoding key and the contents key, for decoding the encrypted contents, it is not necessary to use two keys for encryption. Three or more keys may be used for encryption, and one or more of them may be possessed by the key storage unit 10 outside the DVD player 100. Alternatively, one key may be used for encryption, and the key may be possessed by the external key storage unit 10.

Further, while in this first embodiment the decoding key obtained from the outside is discarded when the playback state of the DVD player 100 becomes "STOP STATE", the decoding key may be discarded according to any other playback state of the DVD 20.

Embodiment 2

Hereinafter, a second embodiment of the present invention corresponding to claims 7 to 18, 21, 27 and 29 will be described with reference to FIGS. 4 to 9.

Initially, a description will be given of a system including a data player and a key storage unit according to the second embodiment of the invention, with reference to FIG. 4.

FIG. 4 is a block diagram illustrating a system including a data player and a key storage unit according to the second embodiment. The system shown in FIG. 4 comprises a key management unit 50 for generating a player key (decoding key) for each data player; a contents key encryption unit 51 for encrypting a contents key by using the player key; a data encryption unit 52 for encrypting contents data to be recorded on a recording medium 30, by using the contents key; a key storage unit 40 for storing the player key and permitting a data player 110 to read the player key; a recording medium (digital medium) 30 containing the contents key 31 encrypted with the player key and contents 32 encrypted with the contents key 31; a data player 110 for reading the player key from the key storage unit 40 and playing the encrypted contents 32 recorded on the recording medium 30; and a clock 53 for giving time data to the data player 110. Preferably, the key storage unit 40 is implemented by a memory card with a CPU, such as a smart card. In this case, the key storage unit 40 and the data player 110 are connected through a memory card node and an IC card reader.

Hereinafter, the internal structures of the key storage unit 40 and the data player 110 will be described in more detail.

The key storage unit 40 comprises a controller 41 for controlling the key storage unit 40; a player key storage (decoding key storage) 42 for storing the player key fabricated by the key management unit 50; an available period storage 43 for storing the available period of the player key; a history data storage (key read history storage) 44 for storing the read history when the player key is read from the key storage unit 40; a contents ID code storage 45 for storing the ID code of the encrypted contents 32 recorded on the recording medium 30; a time data storage 46 for storing the time data transmitted from the data player 110; a player ID code storage 48 for storing the ID code of the storage unit 40; and a key-storage-to-player key storage 49 for storing a key used for encryption or decoding when performing encrypted communication between the key storage unit 40 and the data player 110.

The data player 110 comprises a controller 111 for controlling the data player 110; a player key storage 112 for storing the player key read from the key storage unit 40; a key decoding unit (decoding key obtaining unit) 113 for reading the encrypted contents key 31 from the recording medium 30 and decoding it; a playback unit (decoding unit) 114 for decoding and playing the encrypted contents data 32 included in the recording medium 30, by using the decoded contents key; a contents ID code storage 115 for storing the ID code of the encrypted contents 32 in the recording medium 30; a key receipt time storage 116 for storing the time data from the clock 53; a player ID code storage (device ID code storage) 117 for storing the ID code of the data player 110; a key storage ID code storage 118 for storing the ID code of the key storage unit 40 from which the player key is read; a key-storage-to-player key storage 119 for storing a key used when performing encrypted communication between the key storage unit 40 and the data player 110; and a watermark embedding unit (data embedding unit) 120 for embedding an electronic watermark in the data played by the playback unit 114.

Next, the operation of the system including the data player 110 and the key storage unit 40 will be described with respect to the process of recording the encrypted contents key 31 and the encrypted contents 32 on the recording medium 30 and the process of playing the encrypted contents 32 on the recording medium 30.

Figure 5:
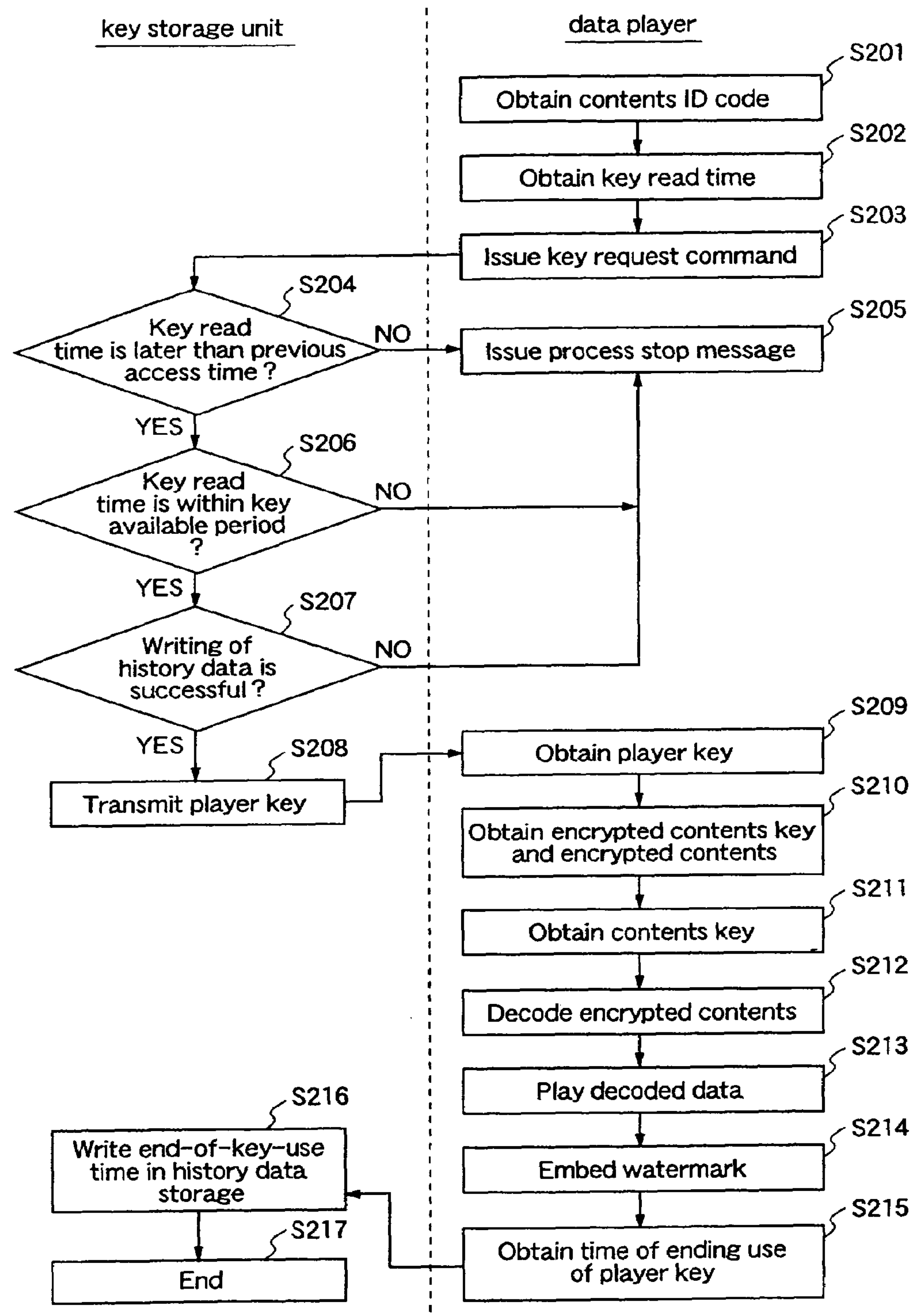
FIG. 5 is a flowchart illustrating an example of operation of the system according to the second embodiment in the case where the data player and the key storage unit perform playback of data.

FIG. 5 is a flowchart for explaining the operation of the system when playing the encrypted contents 32 on the recording medium 30.

Initially, a description will be given of the process of recording the encrypted contents key 31 and the encrypted contents 32 on the recording medium 30.

In the key storage unit 40, the key management unit 50 generates a player key of the data player 110, stores the player key in the player key storage 42, and writes the available period of the player key in the available period storage 43. Further, the key management unit 50 sends the player key and its available period (key read available period data) to a writer (not shown) which writes contents data such as a movie in the recording medium 30. The contents key used for encrypting the contents data in the data encryption unit 52 is encrypted with the player key in the key encryption unit 51. The encrypted contents data 32 and the encrypted contents key 31 so obtained are recorded on the recording medium 30. In this way, there is generated the recording medium 30 containing the encrypted contents data 32 obtained by encrypting the contents data with the contents key, and the encrypted contents key 31 obtained by encrypting the contents key with the player key. Since these processes are performed when generating a movie title or the like of general DVD video, only the outlines of the processes are described above. However, in order to realize distribution to plural data players, usually plural contents keys encrypted with plural player keys corresponding to the plural destinations (data players) are recorded (not shown).

Next, a description will be given of the operations of the key storage unit 40 and the data player 110 when playing the encrypted contents data 32 on the recording medium 30 so obtained, according to the flowchart of FIG. 5.

When the recording medium 30 is played by the data player 110, initially, the controller 111 reads the contents ID code of the recording medium 30 and stores it in the contents ID code storage 115 (step S201). Then, in step S202, the controller 111 takes the present time data from the clock 52 and stores it as the key read time in the time data storage 116. Next, in step S203, a key request command (a signal requesting the player key) is transmitted together with the key read time stored in the time data storage 116, the contents ID code stored in the contents ID code storage 115, and the player ID code (device ID code) of the data player 110 which is stored in the player ID code storage 117, to the controller 41 of the key storage unit 40. These data to be transmitted between the controller 111 of the data player 110 and the controller 41 of the key storage unit 40 are encrypted with the key-storage-to-player key which is common to the both units and stored in the key-storage-to-player key storages 49 and 119. Further, decoding of the encrypted data can be performed software-wise in the controllers 41 and 111.

Next, the controller 41 of the key storage unit 40 stores the key read time, the contents ID code, and the player ID code, which have been transmitted from the data player 110, in the time data storage 46, the contents ID code storage 45, and the player ID code storage 47, respectively. In step S204, the latest time which has already been stored in the history data storage 44 is compared with the key read time stored in the time data storage 46. When the key read time is later than the latest time, it is decided that the process has succeeded. Otherwise, playback of the recording medium 30 is immediately stopped by issuing a process stop message or the like to the data player 110 in step S205.

Next, in step S206, the controller 41 confirms as to whether the key read time is within the available period of the player key which is stored in the available time storage 43. When the key read time is within the available period, it is decided that the process has succeeded. Otherwise, playback is immediately stopped in step S205. Then, in step S207, those data stored in the time data storage 46, the contents ID code storage 45, and the player ID code storage 47 are recorded as the history data in the history data storage 44. If writing of these data fails, the control returns to step S205 to stop the playback immediately.

When the three processes in steps S204, S206, and S207 have succeeded, the control proceeds to step S208 wherein the controller 41 of the key storage unit 40 transmits the player key stored in the player key storage 42 to the controller 111 of the data player 110, together with the key storage ID code of the key storage unit 40 which is stored in the key storage ID code storage 48. In step S209, the controller 111 takes the player key from the key storage unit 40, and stores the player key in the player key storage 112, and the key storage ID code of the key storage unit 40 in the key storage ID code storage 118.

In the data player 110, the player key so obtained from the key storage unit 40 is input to the key decoding unit 113. In step S210, the controller 111 reads the encrypted contents key 31 from the recording medium 30. In step S211, the encrypted contents key 31 is decoded to obtain the contents key. This contents key is input to the playback unit 114. In step S212, the controller 111 reads the encrypted contents data 32 from the recording medium 30, and the encrypted contents data 32 is decoded using the contents key. Thereafter, in step S213, playback is carried out according to the contents of data. That is, when the data to be played is video data compressed in MPEG2 format, the video data is decoded by MPEG2 decoding to transform the data to a video signal. Thereafter, in step S214, the player ID code, the key storage ID code, or the key read time (the time at which the player key read request was made) which are stored in the player ID code storage 117, the key storage ID coded storage 118, and the time data storage 116, respectively, is embedded as a watermark in the data output from the playback unit 114 by the watermark embedding unit 120, and the watermark-embedded data is output to the outside of the data player 110.

After playback of the contents data from the recording medium 30 is completed, in step S215 the controller 111 of the data player 110 transmits an end-of-key-use time at which use of the player key is ended, from the clock 53 to the controller 41 of the key storage unit 40. In step S216, the controller 41 of the key storage unit 40 stores the end-of-key-use time in the history data storage unit 44, whereby playback is ended.

Hereinafter, the process of writing the history data (steps S207 and S216) will be described in more detail with reference to FIGS. 6 and 7.

FIG. 6 is a table showing an example of history data written in the history data storage 44, and FIG. 7 is a flowchart for explaining the process of writing the history data. In the first row of the table of FIG. 6, the start time of the available period of the key has already been written.

Initially, in step S302, writing of the key nonuse period is performed as follows. That is, in the first column of the row next to the last row which has been written most recently, a difference between the time data in the leftmost column of the last row and the key read time (the time at which the player key was requested) which is stored in the time data storage 46 is written as the key nonuse period. In the second column of the same row, the time data in the leftmost column of the last row is written. In the third column of the same row, the key read time is written. Then, hashing is carried out to detect alteration on the data in the just written row and in the previous row, and the result is written in the fourth column.

Next, in step S303, writing of the start time (start time 1) is performed as follows. That is, in the row next to the row which has been written in step S302, the key read time is written in the first column, the player ID code is written in the second column, and the contents ID code is written in the third column. Thereafter, hashing is carried out to detect alteration on the data in the just written row and in the previous row, and the result is written in the fourth column.

Thereafter, as already described with respect to steps S215 and S216 in FIG. 5, the controller 111 of the data player 110 transmits the time data obtained from the clock 53, as a signal indicating that the use of the player key is ended, to the key storage unit 40. On receipt of the time data, in step S304, the controller 41 of the key storage unit 40 writes the end-of-key-use time in the row next to the row which has been written in step S303. More specifically, the end-of-key-use time supplied from the data player 110 is written in the first column, the player ID code is written in the second column, and the contents ID code is written in the third column, and furthermore, hashing is performed to detect alteration on the data in the just written row and in the previous row, and the result is written in the fourth column.

According to the process steps described above, every time the history data is written, it is connected with the previous history data by the alteration detection code. So, even when illegal history data is inserted in the history data shown in FIG. 6, the position of the illegal history data can be easily detected as long as the method of generating the alteration detection code is not discovered. Further, the latest time data is written in the first column in the last row of the written history data, and the following time data is always later than this time. Otherwise, the process is stopped and no key is distributed as described with respect to step S204 in FIG. 5, whereby the illegality of setting the time data backward is avoided.

Further, when the end-of-key-use time is also written as the history data in addition to the player key read time, the time of the clock 53 can be advanced by at least the playback time.

Further, the capacity of the history data storage 44 of the key storage unit 40 may be limited. In this case, when the storage 44 is filled up with the history data, since no more history data is written in the storage 44, it is decided that the process fails and the key distribution is stopped as described for step S207 in FIG. 5. Therefore, the upper bound of the number of key receipt times can be set by limiting the storage capacity.

Next, a description will be given of the watermark embedding method (step S214 in FIG. 5) and a method for detecting the embedded watermark, with reference to FIGS. 8 to 10.

Figure 8:
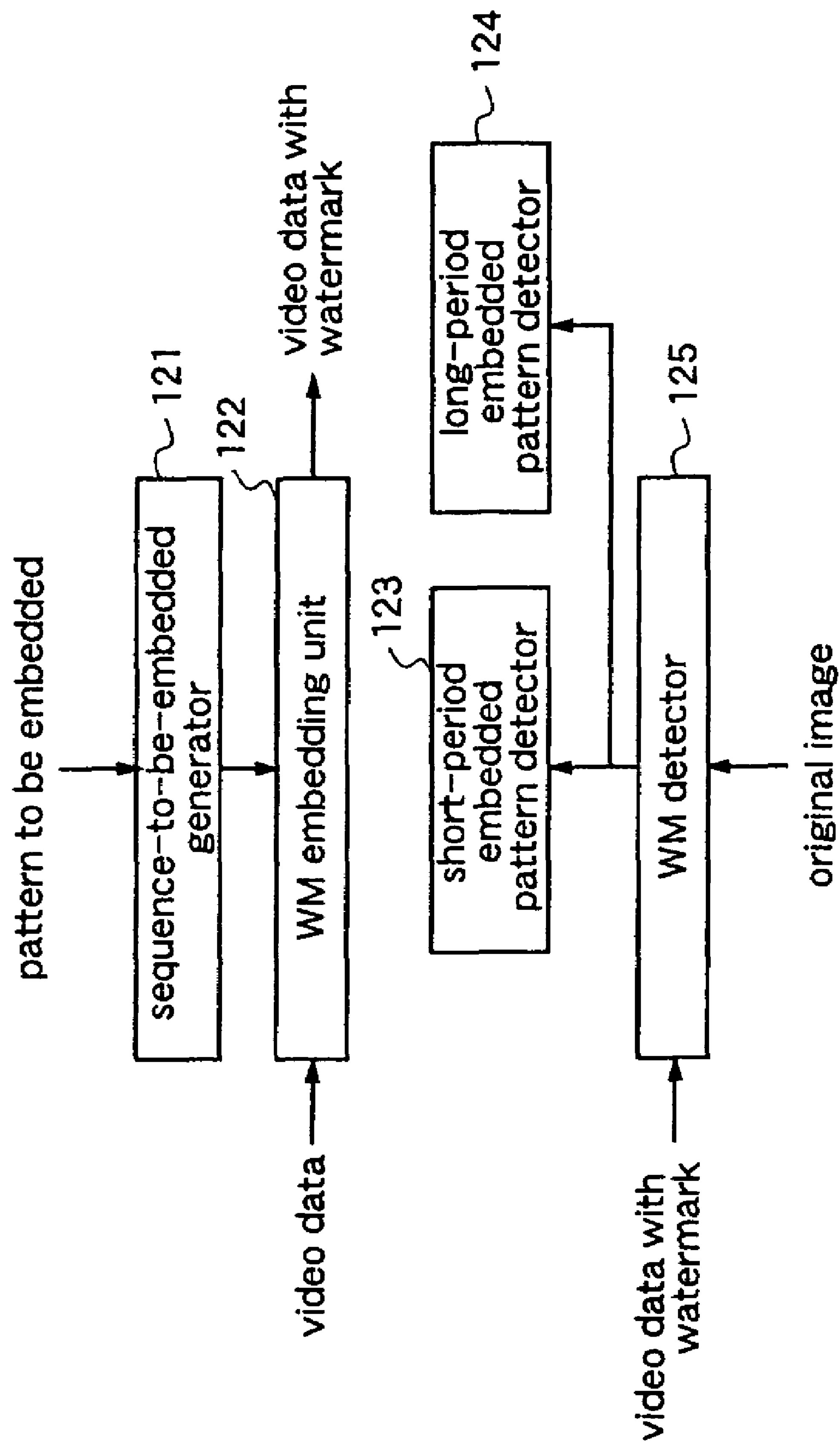
FIG. 8 is a diagram illustrating a watermark embedding apparatus and an embedded data detection apparatus according to the second embodiment.

FIG. 8 is a diagram for explaining the structure of the watermark embedding unit 120 and the structure of a watermark detection unit. FIG. 9 is a diagram for explaining pattern sequences embedded in frames as the result of the watermark embedding process. FIG. 10 is a diagram for explaining the case where the history data written as shown in FIG. 6 is used for reading the embedded data.

Initially, the structure of the watermark embedding unit 120 will be described with reference to FIG. 8.

In FIG. 8, a sequence generator 121 converts data to be embedded into a pattern sequence to be embedded in video frames. A watermark embedding unit 122 embeds the pattern sequence generated by the sequence generator 121, frame by frame, thereby converting the input data to watermark-embedded data. Further, watermark detector 125 detects the pattern embedded in the frames by the watermark embedding unit 122. A watermark short-period embedded pattern detector 123 and a watermark long-period embedded pattern detector 124 detect the embedded data from the pattern detected by the watermark detector 125.

The operation of the watermark embedding unit will be described with reference to FIGS. 8 and 9. As a pattern to be embedded, a bit pattern including the player ID code of the data player 110, the storage ID code of the key storage Unit 40, or the time data is inputted to the sequence generator 121. In the sequence generator 121, the inputted bit pattern is converted to a pattern sequence to be embedded frame by frame, and transmitted to the watermark embedding unit 122. More specifically, in the sequence generator 121, the inputted bit pattern is divided into plural patterns according to the number of bits to be embedded in each frame, thereby providing plural patterns to be embedded in the respective frames. For example, in the case where the bit pattern to be embedded has 8 bytes and this pattern is to be embedded by 4 bits per frame as shown in FIG. 9, when the pattern to be embedded is “0110010111001010”, “65ca” based on hexadecimal is embedded in the first four frames. Next, the first bit value “0” of the embedded pattern is input to the same number of frames as described above. That is, the first bit value of the embedded pattern is embedded for a period equivalent to the frame length as long as the previously embedded pattern. For example, when the value to be embedded is “0”, “0” is output for a period of 4 frames. When it is “1”, “FFFF” based on hexadecimal is output for a period of 4 frames. Next, the initially embedded pattern “65Ca” is embedded again and then the second bit value of the embedded pattern is embedded. In this way, sequentially embedding the pattern to be embedded in a predetermined number of frames, and embedding only one bit of the embedded pattern in the same number of frames, are alternately repeated.

The watermark detector 125 detects the embedded pattern frame by frame. While in this second embodiment the original image is used as a reference image, the original image is not referred to when an embedding method that can detect the embedded pattern without referring to the original image is employed. The result of the frame-by-frame detection of the embedded pattern is transmitted to the short-period embedded pattern detector 123 and the long-period embedded pattern detector 124. The short-period embedded pattern detector 123 repeatedly compares the results of detection on the bit sequences embedded in short periods to detect, for each bit, the bit value which appears most frequently. The long-period embedded pattern detector 124 obtains the result of detection in the period of embedding each bit, for example, whether all of the bits in the frames from the fifth frame to the eighth frame are “1” or “0”. When all of the detected values are not equal, the bit value (“1” or “0”) detected in larger number is selected.

In the above-described short-period embedded pattern detection, the embedded data can be decoded with a small number of frames. On the other hand, in the long-period embedded pattern detection, since bit-by-bit detection is carried out over a long period, correct values can be obtained by majority decision even when some watermarks are altered, whereby the embedded patterns can be obtained by performing bit-by-bit detection for all of the embedded patterns.

When data is embedded in short periods, since the embedded data appears in every several frames in the video, the embedded data can be detected even when the video data is edited, but this method is not resistant to alteration such as frame extraction. On the other hand, when data is embedded over a long period, the embedded pattern cannot be detected unless the video data is detected for the long period, but this method is resistant to alteration such as frame extraction. Therefore, by using the two embedding methods together, an embedding method resistant to alteration and edition is realized by compensating each other's weak point.

The manner of using the short-period embedding method and the long-period embedding method together is not restricted to that described for the second embodiment. For example, assuming that four bits are embedded in one frame, three bits of them may be used for short-period embedding while using the remaining one bit for the long-period embedding.

Next, a description will be given of the case where the history data written as shown in FIG. 6 is utilized for reading embedded data as mentioned above, with reference to FIG. 10.

Figure 10:
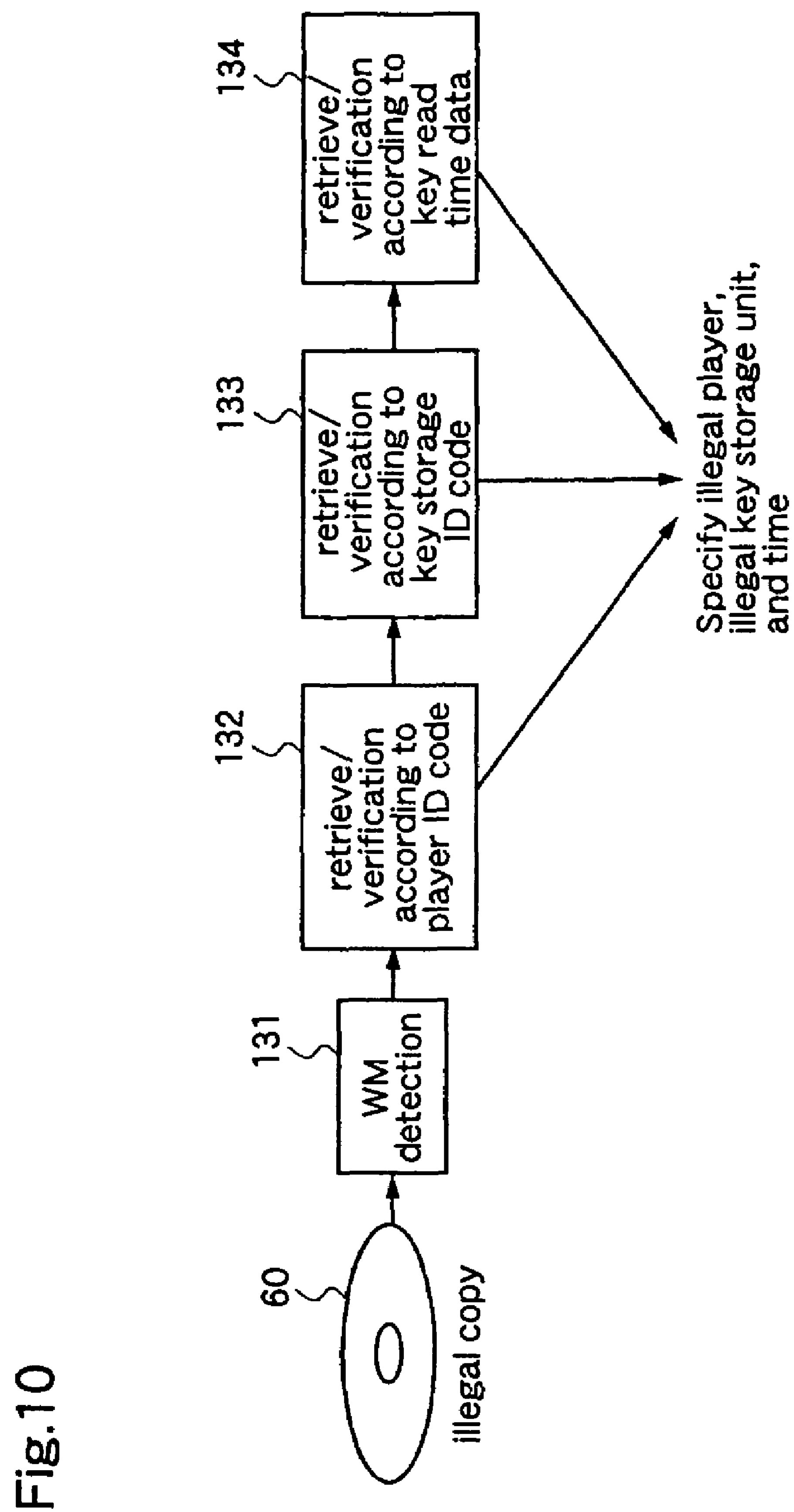
FIG. 10 is a diagram illustrating an example of a device to specify an illegal device, an illegal key storage unit, or the time when an illegal act was carried out, by using the recorded history data according to the second embodiment.

FIG. 10 is a diagram illustrating the construction of a device for specifying an illegal player, an illegal key storage unit, or the time at which an illegal act was carried out.

In FIG. 10, 60 denotes an illegally copied recording medium, and 131 denotes a watermark detector comprising, for example, the watermark detector 125, the long-period embedded pattern detector 123, and the short-period embedded pattern detector 124 shown in FIG. 7. Further, 132 denotes a retrieve/verification process according to the player ID code of the data player 110, 133 denotes a retrieve/verification process according to the key storage ID code of the key storage unit 40, and 134 denotes a retrieve/verification process according to the key read time data.

There is the possibility that the embedded data detected by the watermark detector 131 could have been altered by an illegal user. That is, it is supposed that the illegal user has tried to delete or alter the embedded data to escape from pursuit according to the embedded data. As the result, the original data may be defected by removing the embedded part, or part of the data may be wrongly detected due to alteration by embedding random data in the original data. As long as at least one of the embedded data is detected correctly, the remaining data can be restored by retrieving the history data base wherein the history data withdrawn from the history data storage 44 of the key storage unit 40 is stored. That is, in the retrieve/verification processes 132, 133, and 134 according to the player ID code, the key storage ID code, and the key read time, respectively, each data can be used to restore the remaining data. Further, the illegal player or key storage unit or the time when the illegal act was done can be estimated with fairly high probability by putting these data together and detecting one having the highest correlation with any of them, from the history data.

As described above, according to the data player 110 of this second embodiment, the player key read history is stored in the key storage unit 40. Therefore, even when someone tries to make a false declaration of the present time in confirming the available period or the like, since the time to receive the player key is always in the clock advancing direction, the illegal user cannot play the data over the playback time in which the data is continuously played.

Further, since the capacity of the history data storage 44 of the key storage unit 40 is limited, any player cannot obtain the key exceeding the capacity, whereby the upper bound of the number of illegal acts can be set.

Further, writing of history which cannot be easily altered is realized by giving hash values to the history.

Furthermore; according to the second embodiment, the precision in detecting the embedded data can be increased with the history data written in the history data storage 44 of the key storage unit 40. Further, collation of the history data with the detected embedded data can provide certain evidence of illegality.

Moreover, since two data embedding patterns, i.e., the short-period pattern and the long-period pattern, are used together, a data embedding method resistant to alteration is realized.

In this second embodiment, the key's available period and the like are checked when the key storage unit 40 reads the key. However, as long as the data player 110 is guaranteed for anti-tamper characteristics and is not modified, the data player 110 may receive the key data and the history data by encrypted communication from the key storage unit 40 to check the available period and the like on the basis of these data. In this case, also the history data may be generated in the data player 110 and transmitted to the key storage unit 40 by encrypted communication to be stored therein.

Further, when the time data is taken from the history data in checking the previous access time in step S205 of FIG. 5, it may be checked using the hash values shown in FIG. 6 as to whether the history data itself was altered or not, whereby the higher safety is achieved. That is, alteration check is realized by performing the same process as calculating the hash value from the history data and then checking whether the result matches the hash value or not.

Further, in this second embodiment, when writing the history data, the completely continuous history data, i.e., the player key read request time, the end-of-key-use time, and the key nonuse period. However, even when only the access time to the key is written, the feature of the invention that the time data is advanced only in the clock forward direction is maintained and, therefore, the effects of the present invention are maintained.

Embodiment 3

Hereinafter, a third embodiment of the present invention corresponding to claims 19 to 26, and 28 will be described with reference to FIGS. 11 and 12.

Initially, the process of embedding data in a video/audio signal will be described with reference to FIG. 11.

Figure 11:
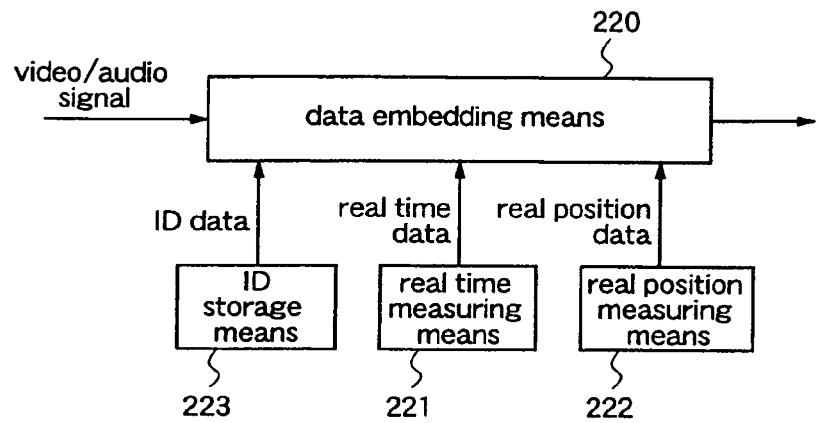
FIG. 11 is a diagram illustrating a data embedding unit according to a third embodiment of the present invention.

FIG. 11 is a block diagram illustrating a data embedding apparatus according to the third embodiment of the invention. In FIG. 11, 220 denotes a data embedding means, 221 denotes a real time measuring means, 222 denotes a real position measuring means, and 223 denotes an ID storage means.

Next, the operation of the data embedding means so constructed will be described.

The data embedding means 220, to which a video/audio signal is input, embeds the following data in the video/audio signal: ID data for identifying a device, which is output from the ID storage means 223; real time data for specifying the present time, which is output from the real time measuring means 221; and real position data for specifying the present physical position, which is output from the real position measuring means 222. Thereafter, the data embedding means 220 outputs the data-embedded video/audio signal. The video/audio signal to be input to the data embedding means 220 is an analog or digital video signal or an analog or digital audio signal, and this signal is in the visible or audible state.

Hereinafter, the functions of the respective constituents will be described in detail.

As the real time measuring means 221, means having an arbitrary construction capable of outputting real time data which specifies the present time, can be used. For example, it is implemented by a clock or a counter. As the real time data, "year, month, date (day of month), hour, and minute" based on Greenwich Mean Time (English standard time) may be used. Of course, the standard time of any country may be selected. Further, the range of the real time data may be selected according to a request or use, such as "year, month, and date", "year and month", "year, month, date, and hour", or "year, month, date, hour, minute, and second". Further, the real time data is not limited to data representing the general time as described above. Any data may be used as long as it can specify the time where data was embedded. For example, based on specific date and time (e.g., Jan. 1, 2000, 12 o'clock midnight (00:00)), the real time data may be represented by some minutes or some hours from this date and time. When the real time measuring means 221 is applied to a system that can record the history of processing (in this case, playback) such as an electronic cinema, the real time data may be represented by the number of processing times.

Next, the real position measuring means 222 has an arbitrary construction which can measure its physical position to output real position data for specifying this position, such as a GPS (Global Positioning System). As the real position data, data in an arbitrary form which can specify a physical position, such as a combination of the latitude and the longitude, may be used.

To implement the real position measuring means 222, there is a method of measuring its physical position on the basis of a position reference signal supplied from the outside, and outputting it as real position data. As a typical example of this, there is a method according to the GPS. The GPS receives waves from plural navigation satellites with an antenna, calculates the distances from it to the satellites according to the arrival times of the waves by using a real position measuring means, and measures its position from the distances. The GPS has been practically used for a car navigation system or the like. As another example, there is a method according to GLONASS (Global Navigation Satellite System) using the same principle as that of the GPS. Further, there is another example according to DGPS (Differential GPS). The DGPS receives GPS compensation data through a FM wave and compensates the position according to the GPS, in addition to the operation of the GPS. Further, there is still another example according to PHS (Personal Handy Phone) measurement. The PHS measurement receives waves from three PHS base stations of higher field intensities, and measures its position on the basis of the positions of the base stations and the field intensities of the received signals.

The real position measuring means 222 is implemented by any of the above-mentioned examples or a combination of them. However, the present invention is not restricted thereto. The real position measuring means 222 can be implemented by an arbitrary construction which receives, with an antenna, signals from plural satellites or fixed stations as reference position signals, and measures its physical position according to the reference position signals. As a method for measuring the physical position, there is an arbitrary means for calculating the position from the arrival times or intensities of waves from the outside. Further, the real position measuring means 222 may be combined with means for obtaining its precise position by using data for compensation which has been received separately through broadcasting, or data about the travel distance or direction of a mobile body such as a car or an airplane on which the real position measuring means 222 is mounted, or a map. Further, means for directly receiving position data from the server, or a combination of these means, may be used as long as the real position measuring means 222 can measure its physical position.

The data embedding means 220 has an arbitrary construction for embedding the ID data, the real time data, and the real position data in a video/audio signal. This means is implemented by an arbitrary method for embedding data and, thereafter, detecting the embedded data. For example, assuming that the signal output from the decoding means 230 is a video signal, data can be multiplexed in the blanking period of the video signal. Further, an arbitrary means for embedding data in video or audio, which is known as watermarking, may be used.

Hereinafter, a data embedding method using watermarking will be described.

The data embedding method using watermarking may employ replacement of pixels corresponding to data to be embedded. In this method, initially, at least one pixel is selected from each frame of video, based on the data to be embedded. For example, a number is calculated from the data, and a pixel in the position indicated by the number is selected. Next, the data of the selected pixel is replaced with the data calculated from the data of an adjacent pixel. When detecting the data, the replaced pixel can be detected by comparing the image in which the data is embedded with the image in which no data is embedded, i.e., the original image decoded from the stream. The data can be restored from the position of the detected pixel.

Another example of watermarking is described in, for example, "Data Hiding Technique Supporting Watermarking", pp. 149~162, Nikkei Electronics, Feb. 24, 1997 (No. 683), and "Techniques for Data Hiding", written by W. Bender, D. Gruhl, N. Morimoto, A. Lu, IBM Systems Journal, Vol. 35, Nos. 3&4, 1996. In this method, two pixels (Ai,Bi) are selected from video by pseudo random numbers, and when the bit to be embedded is "1", the luminance level Yai of Ai is raised by d while the luminance level Ybi of Bi is lowered by d. Inversely, when the bit to be embedded is "0", the luminance level of Ai is lowered by d while the luminance level of Bi is raised by d. The value of d is an integer from 1 to 5. By repeating these processed n times (usually, n is about 10,000), data is embedded in the video. When detecting the embedded data, two luminance levels in the same positions as described for the data embedding process, i.e., (Yai+d, Ybi−d) or (Yai−d, Ybi+d), are extracted from the video by the pseudo random numbers, and a difference between these points is calculated. These processes are repeated for each position by n times, and the average of the differences is obtained and, thereafter, it is decided that the embedded bit is "0" or "1" according to that the average is near to +2d or −2d.

Besides the methods mentioned above, there are various kinds of data embedding methods, and an arbitrary method may be employed.

Next, the process of detecting the embedded data will be described with reference to FIG. 12.

Figure 12:
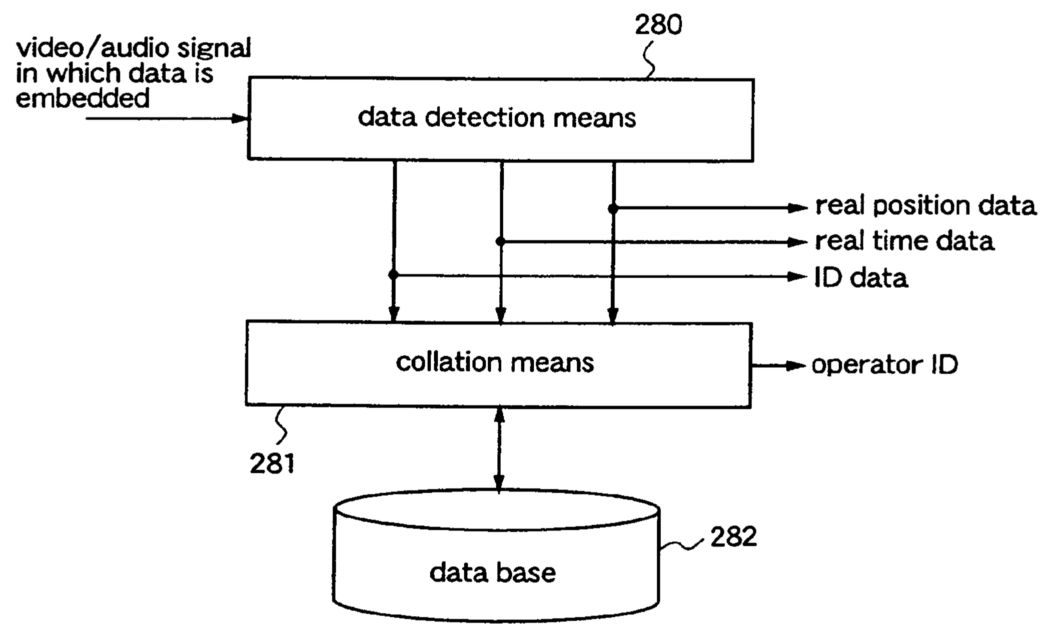
FIG. 12 is a diagram illustrating a construction for detecting the embedded data according to the third embodiment.

FIG. 12 is a block diagram illustrating an example of a construction for detecting embedded data, and specifying a data player used for an illegal act or an operator of the player.

When the video/audio signal including data embedded by the data embedding means 220 is illegally used, the embedded data is used for specifying the illegal player including the data embedding means 220 and its operator. Here, "illegal use" means to use the video/audio signal played by the player, for copying, retransmission, or edition without permission.

In FIG. 12, reference numeral 280 denotes a data detection means, 281 denotes a collation means, and 282 denotes a data base. The data detection means 280 detects at least one of the ID data, the real time data, and the real position data which are embedded in the video/audio signal, and outputs the data. To be specific, the data detection means 280 detects the data embedded by the data embedding means 220 from difference data obtained by comparing the input video/audio signal with the video/audio signal in which the data has not yet been embedded. The detection method is not restricted to the above-mentioned one, and any method corresponding to the embedding process by the data embedding means 220 may be employed. For example, embedded data can be directly detected from a video signal in which the data is embedded in the blanking period. Further, when data is embedded in a video/audio signal by watermarking, the embedded data can be detected by comparing the data-embedded video/audio signal with the video/audio signal in which the data has not yet been embedded. From these detected data, you can know the ID data of the player used for playback, the time when playback was carried out, and the physical position where playback was carried out. These data can be used for investigating the illegal player and its operator from the illegally used video/audio signal.

Further, in the data base 202, the ID of the operator of the player may be written in association with the ID data of the player, the time of the operation, and the place of the operation. In this case, the operator ID can be specified by the collation means 281. Such data base can be created according to reports from managers of data players in systems the operators of which can be specified, such as AV systems in electronic movie theaters or airplanes. The data base 282 and the collation means 281 can specify the operator more easily in a system which can construct the data base 282.

As described above, according to the third embodiment of the present invention, by mounting or using the data embedding means 220 on or together with a video/audio signal player, recorder, or editor, the device used for the process (i.e., playback, recording, or edition) and the time and place can be specified. Therefore, when the video/audio signal is illegally processed, the illegal use can be detected, i.e., the illegally used player and the time and place of the illegal use can be specified. For example, it is assumed that the data embedding means 220 is mounted on a data player, and data is embedded in a signal played by the data player. In this case, when the video/audio signal played by the data player is illegally recorded on a recording medium, the player which played the video/audio signal, the time, and the place can be specified from the recorded video/audio signal, whereby the illegal user is specified and further illegal use can be prevented.

Furthermore, according to the third embodiment, since the data for specifying the illegal person can be detected as well, the effect of dissuading people thinking of doing illegal acts is also expected.

While in this third embodiment the ID data, the real time data, and the real position data are multiplexed in the video/audio signal, the real position measuring means 222 may be dispensed with and only the ID data and the real time data may be multiplexed. In this case, the player and the time by/at which playback was performed can be detected. Alternatively, the real time measuring means 221 may be dispensed with and only the ID data and the real position data may be multiplexed. In this case, the player and the place by/in which playback was performed can be detected. Further, only the real position data may be multiplexed. In this case, only the place where playback was performed can be detected.

Furthermore, while in this third embodiment a video/audio signal is adopted as the object of processing, the object may be only a video signal or an audio signal. Further, the object may be a video or audio signal compressed by MPEG. Furthermore, the object may be data of text or program. Also in these cases, the same effects as described above are achieved.

The ID storage means 223 may be implemented by a removable device such as an IC card, with the same effects as described above.

Further, while in this third embodiment data which can specify a device is used as ID data, data which can specify a company or a place relating to a device may be used as ID data, for example, a manufacturer of the device, a carrier using the device, a mobile body (airplane, bus, etc.) in which the device is used, a hall or movie theater in which the device is used. Alternatively, the ID of the user of the device may be used as ID data. The user ID may be stored in the ID storage means 223, or it may be input through an input means such as a keyboard or a remote controller. As described above, as ID data, any data for identifying a device itself, a carrier or place relating to the device, or a user of the device, may be employed, with the same effects as described above. Of course, a combination of these data may be used.

Further, while in this third embodiment the data embedding apparatus embeds the ID data, the real time data, and the real position data, the apparatus may be constructed so that it embeds arbitrary data relating to a device, person, company, or place by/in which the processing was performed, with the same effects as described above.

While the data embedding apparatus of this third embodiment is constructed as shown in FIG. 11, it can be implemented by an arbitrary construction that performs the same operation as mentioned above. It is also possible to implement the data embedding apparatus by a combination of a CPU or processor with a program, which realizes the process of embedding some or all of the ID data, the real position data, and the real time data in a video/audio signal.

Further, the data embedding apparatus may be constructed so that the ID data, the real time data, and the real position data are encrypted when being embedded, and decoded when being detected. This construction makes alteration of these data difficult. Further, an arbitrary encryption technique such as authentication or signature makes alteration more difficult.

Embodiment 4

Hereinafter, a fourth embodiment of the present invention corresponding to claims 30 and 32 will be described with reference to FIGS. 13 and 14.

Figure 13:
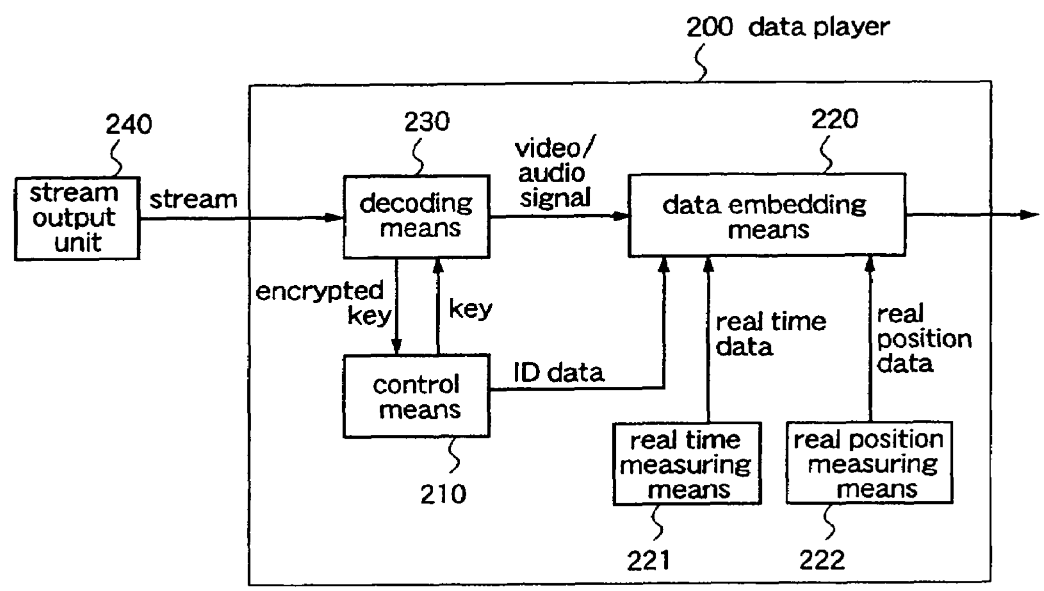
FIG. 13 is a diagram illustrating a playback system according to a fourth embodiment of the present invention.

FIG. 13 is a block diagram illustrating a playback system according to the fourth embodiment. In FIG. 13, 200 denotes a data player, 220 denotes a data embedding means, 210 denotes a control means for controlling the data player 200, 221 denotes a real time measuring means, 222 denotes a real position measuring means, 240 denotes a stream output unit (data output means), 230 denotes a decoding means for decoding data outputted from the stream output unit 240.

The stream output unit 240 outputs a stream like an MPEG-TS (Moving Picture Expert Group-Transport Stream) which is recorded on a recording medium or received by broadcasting. This stream is encrypted, and a key used for encryption is also encrypted and multiplexed in the stream. Since the data embedding means 220, the real time measuring means 221, and the real position measuring means 222 operate in the same way as described for the third embodiment and, therefore, repeated description is not necessary.

The operation of the playback system so constructed will be described hereinafter.

A stream outputted from the stream output unit 240 is input to the data player 200 and decoded by the decoding means 230. The decoding means 230 separates the encrypted key from the stream and outputs it. The encrypted key is decoded by the control means 210 and inputted to the decoding means 230 again. The decoding means 230 decodes the stream by using the key. Further, the decoding means 230 decodes the stream to obtain a visible/audible signal. That is, the decoding means 230 performs demultiplexing of the multiplexed stream, and decompression of the compressed stream to convert it into a visible/audible signal.

The signal outputted from the decoding means 230 is input to the data embedding means 220. In the data embedding means 220, the ID data outputted from the control means 210, the real time data outputted from the real time measuring means 221, and the real position data outputted from the real position measuring means 222 are embedded in the input signal. The ID data is a device ID for specifying the data player 200.

As described above, in the signal played by the data player 200, the following data are embedded: the ID data for specifying the player 200, the real time data for specifying the time when the signal was played, and the real position data for specifying the place where the signal was played, and these data are detectable. Accordingly, when a recording medium, on which the signal played by the data player 200 is recorded without permission, is illegally sold or distributed, it is possible to specify the device, time, and place of the illegal recording, from the signal recorded on the recording medium.

Accordingly, further illegal acts can be avoided by utilizing the data of the specified device, time, and place.

To facilitate understanding, how the illegality is detected or avoided will be described hereinafter.

It is assumed that the playback system of this fourth embodiment is used for playing a movie on a mobile body such as an airplane or a bus. As an example of illegality, it is supposed that the movie is copied without permission by a working staff or a passenger. In this case, the playback system of this fourth embodiment can specify the data of the device, time, and place of the illegal copying, from the illegally copied video/audio signal. Furthermore, it is possible to mark down the person who illegally copied the movie, according to the specified data and the boarding list of the working staff and passengers. It is supposed that, as another example of illegality, someone carries out the playback system without permission and then performs illegal copying. In this case, the device carried out and used for the illegal copying, and the time and place when/where the illegal copying was performed, can be specified. Even when illegal copying is performed in an individual home, the device or the home by/in which the illegal copying was carried out.

Furthermore, the playback system of this fourth embodiment can detect the data which specifies a person who did an illegal act, and this will dissuade a person who is thinking of doing an illegal act from actually doing it.

While in this fourth embodiment the stream output unit 240 outputs an MPEG-ST, the stream output unit is not restricted thereto. Hereinafter, another example of the stream output unit 240 will be described.

The stream output unit 240 is an arbitrary device for outputting a digitized video signal, an audio signal, data, or a stream in which these are multiplexed. Further, the stream is a digital signal of an arbitrary format including video, audio, data, and the like. Examples of stream formats are as follows: MPEG1 video, Layer I, Layer II, or Layer III (generally called as MP3) audio, MPEG2 video, BC or AAC audio, and Dolby-AC3 audio. Further, there are MPEG2-TS and MPEG2-PS (program stream) obtained by multiplexing them. Further, there are MPEG4 video, TwinVQ audio, and DV format video or audio. Furthermore, the stream output unit 240 can output analog video or audio and, of course, an arbitrary format may be used.

Examples of the data output unit 240 for outputting the above-described streams are as follows: a digital broadcast tuner which receives a signal of satellite broadcasting or ground-wave broadcasting which is transmitted in a radio wave, and plays a stream from the received signal; a digital broadcast tuner which receives a signal of a cable TV transmitted through a cable such as a coaxial cable or an optical fiber, a retransmitted signal of satellite broadcasting or ground-wave broadcasting, or a signal of wire broadcasting, and plays a stream from the received signal; a data player which plays a stream from a signal recorded on recording media, for example, an optical disk such as a DVD or a CD (compact disk), a magneto-optical disk, a magnetic disk, a tape such as a digital VHS or DV, a hard disk, and a solid memory; a receiver which receives a signal transmitted through a telephone line, Ethernet, or a network such as ATM, and plays a stream from the received signal; and a PC (personal computer) or a processor which realizes the above-described functions. Of course, the data output unit 240 is not restricted to those examples mentioned above, and an arbitrary device which outputs a stream may be used.

As described above, the stream output unit 240 may have an arbitrary construction which outputs an arbitrary stream. In this case, the decoding means 230 has an arbitrary construction which can decode the stream outputted from the stream output unit 240.

While in this fourth embodiment an encrypted stream and its key are multiplexed when being output from the stream output unit 240, the present invention is not restricted thereto. For example, when encryption is performed using a key stored in the control means 210, this key is not necessarily multiplexed in the stream. Further, an unencrypted stream may be output from the stream output unit 240. In these cases, the control means 210 realizes only the process required for each case.

Figure 14:
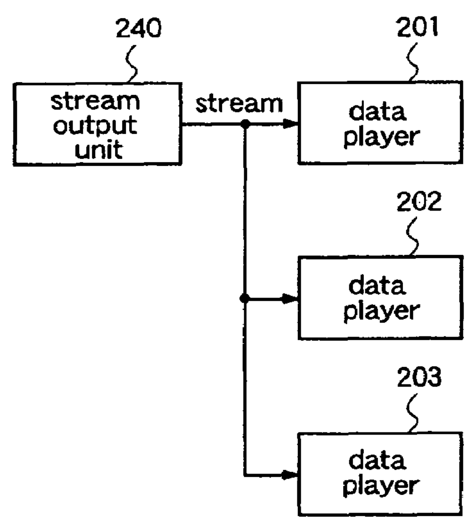
FIG. 14 is a diagram illustrating a playback system having a plurality of players, according to the fourth embodiment.

Further, while in this fourth embodiment the stream output unit 240 and the data player 200 are connected by one-to-one correspondence, a stream outputted from one stream output unit 240 may be played by plural data players 201, 202, and 203 as shown in FIG. 14. The number of data players is not restricted to three.

Further, the control means 210 may be implemented by a removable device such as an IC card, with the same effects as described above.

While in this fourth embodiment the ID data is outputted from the control means 210, the data player 200 may have an ID storage means with the same effects as described above.

While in this fourth embodiment the data player 200 has both of the real time measuring means 221 and the real position measuring means 222, one of these means may be dispensed with.

Embodiment 5

Hereinafter, a fifth embodiment of the present invention corresponding to claims 31 and 33 will be described with reference to FIGS. 15 to 17.

Initially, the construction of a playback system according to this fifth embodiment will be described with reference to FIG. 15.

Figure 15:
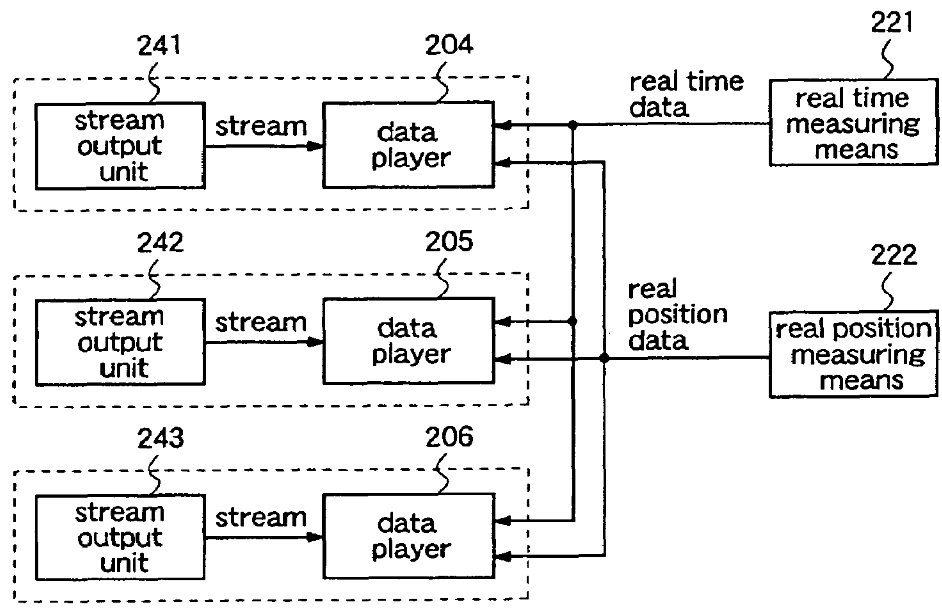
FIG. 15 is a diagram illustrating an example of a playback system according to a fifth embodiment of the invention.

FIG. 15 is a block diagram illustrating an example of a playback system according to the fifth embodiment. In FIGS. 15, 204, 205, and 206 denote data players, 241, 242, and 243 denote stream output units, 221 denotes a real time measuring means, and 222 denotes a real position measuring means.

In this fifth embodiment, the real time measuring means 221 and the real position measuring means 222 are identical to those described for the third embodiment, and the stream output units 241, 242, and 243 have the same construction as that of the stream output unit 240 according to the fourth embodiment.

Further, each of the data players 204, 205, and 206 according to this fifth embodiment is different from the data player 200 according to the fourth embodiment only in that it does not include the real time measuring means 221 and the real position measuring means 222, and receives real time data and real position data supplied from the outside.

The playback system so constructed provides the same effects as those provided by the playback system of the fourth embodiment. In addition, the number of the real time measuring means 221 and the real position measuring means 222 can be reduced, and the precision of real time data or real position data is prevented from varying amongst the data players.

Further, when each of the data players 204, 205, and 206 is constructed so that it performs playback only when correct real time data and correct real position data are input, undesired illegality or malfunction such that playback is performed without embedding the real time data and the real position data, is avoided.

Thereby, when the stream output units 241~243 and the data players 204~206 are stolen, playback by the stolen units is avoided. For example, when these units are used in seats of an airplane or a bus, the respective units are set so that they perform playback only when the signals from the real time measuring means 221 and the real position measuring means 222 are supplied. Thereby, even when stolen, these units cannot be used for playback, whereby illegal playback is avoided.

A method for controlling the data players 204, 205, and 206 so as to operate only when correct real time data and correct real position data are input, is implemented by an arbitrary construction. The simplest method is to make each data player perform playback only when the real time data and the real position data are input. Further, in order to increase the security, there is a method of adding error correction codes or encrypted signatures to the real time data and the real position data, or a method of performing encrypted authentication. Further, the security is also increased by a method of transmitting key data for decoding the stream, together with the real time data and the real position data. Further, these controls may be performed by the controlling means of the data player.

Next, another example of a playback system according to the fifth embodiment will be described with reference to FIG. 16.

Figure 16:
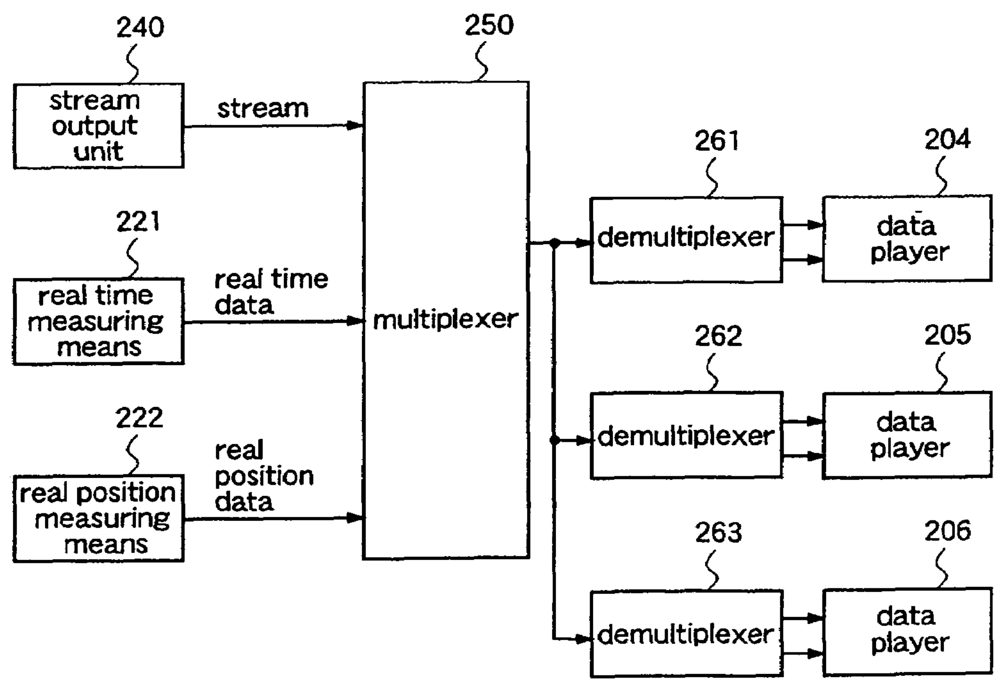
FIG. 16 is a diagram illustrating another example of a playback system according to the fifth embodiment.

FIG. 16 is a block diagram illustrating a playback system having only one stream output unit.

In FIG. 16, a playback system is constituted such that a stream outputted from a stream output unit 240 is played by plural data players 204, 205 and 206. In this case, the stream, the real time data, and the real position data are multiplexed by a multiplexer 250 and, before the multiplexed stream and data is input to the data players 204, 205, and 206, it is separated into the stream, the real time data, and the real position data by demultiplexers 261, 262, and 263, respectively. Thereby, the number of lines used for transmission is reduced. Only the real time data and the real position data may be multiplexed by the multiplexer 250.

Figure 17:
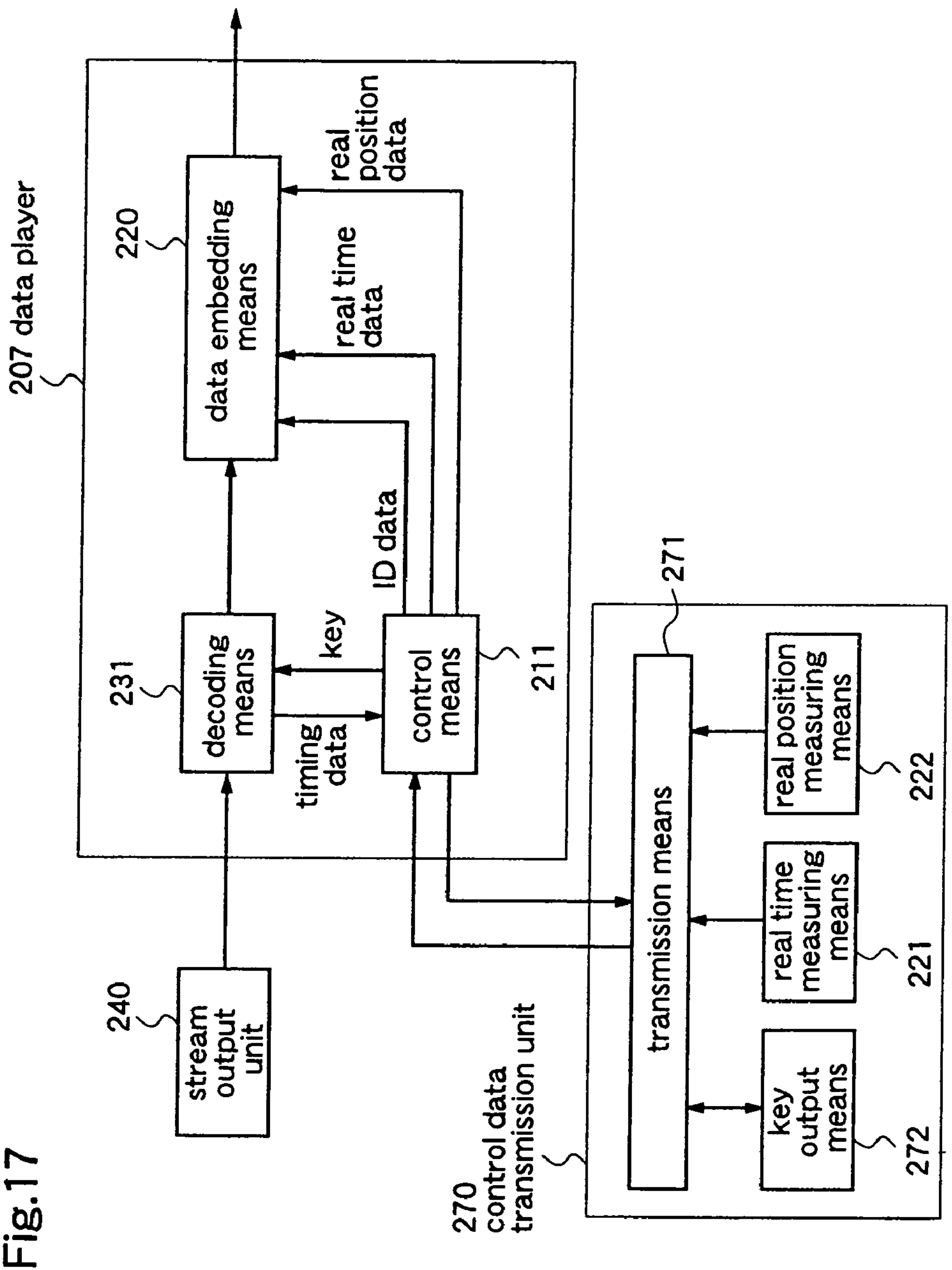
FIG. 17 is a diagram illustrating still another example of a playback system according to the fifth embodiment.
Figure 18:
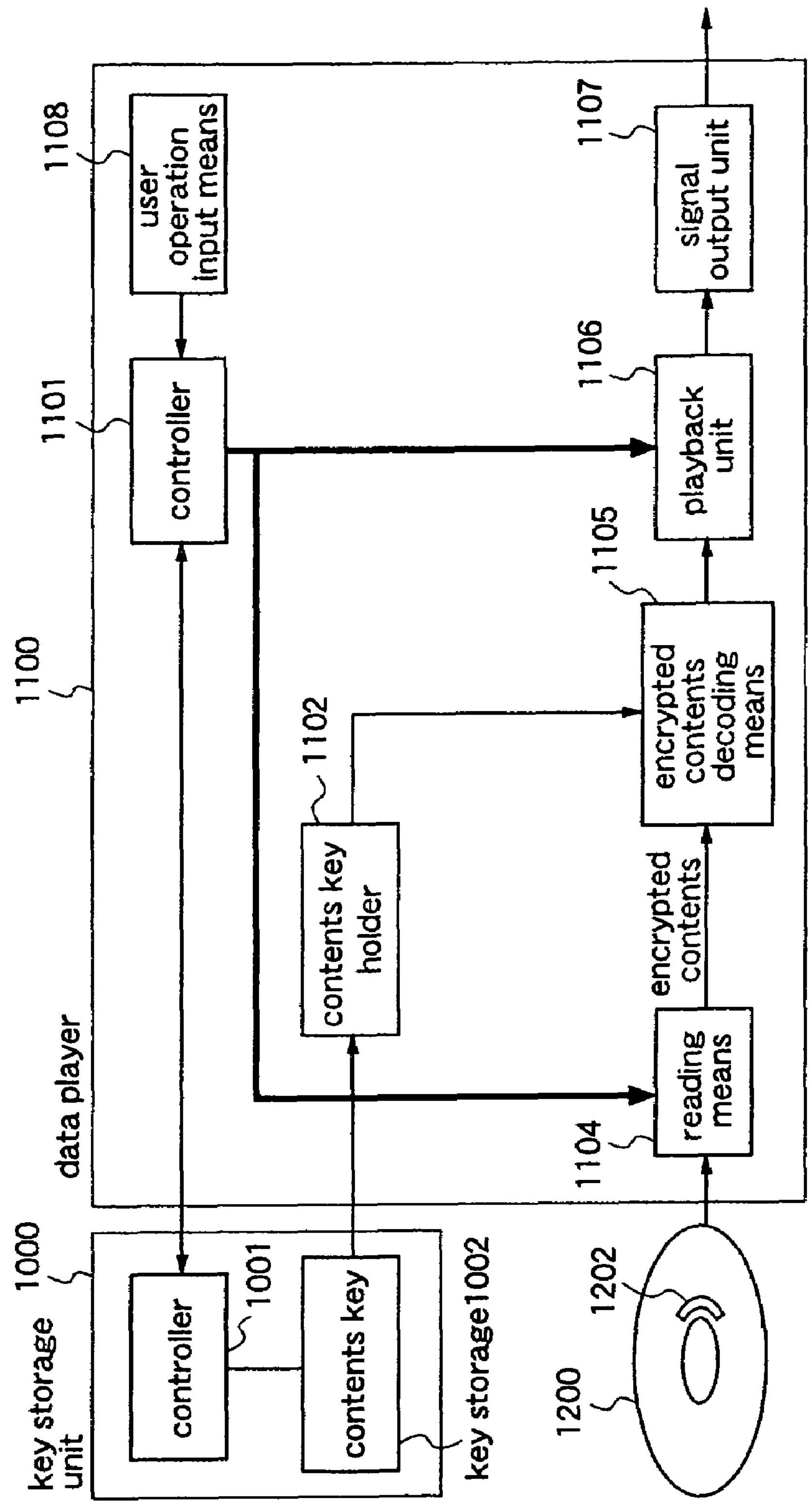
FIG. 18 is a diagram illustrating a conventional data player.

Another example of a playback system according to the fifth embodiment is shown in FIG. 17.

In FIG. 17, a decoding means 231 extracts the data indicating time or the like from the data embedded in the stream and outputs timing data, and a control means 211 transmits the timing data through a transmission means 271 of a control data transmission apparatus 270 to a key transmission means 272. The key transmission means 272 calculates the key transmission timing from the timing data, and outputs an encrypted key. The transmission means 271 transmits the encrypted key, the real time data outputted from the real time data measuring means 221, and the real position data outputted from the real position measuring means 222 to the control means 211 of the data player 207. The control means 211 generates a key from the encrypted key received, and outputs it to the decoding means 231. At the same time, the control means 211 outputs the received real time data and real position data to the data embedding means 220. In this construction, the data player 207 cannot obtain the key for decoding encryption and therefore cannot play the stream unless it receives the real time data and the real position data.

While in this fifth embodiment the playback system is provided with both of the real time measuring means 221 and the real position measuring means 222, one of these means may be dispensed with.

What is claimed is:

1. A data player for reading contents encrypted by a contents key and the contents key encrypted by a decoding key, from a digital medium, and playing the encrypted contents by using the decoding key which is stored in a key storage unit, said data player comprising:

key obtaining means for performing mutual authentication with the key storage unit to obtain the decoding key stored in the key storage unit;

key holding means for holding the decoding key;

playback state obtaining means for monitoring the playback state of the digital medium;

encrypted contents key decoding means for decoding the encrypted contents key by using the decoding key to obtain the contents key; and encrypted contents decoding means for decoding the encrypted contents by using the contents key;

wherein the decoding key is obtained by the key obtaining means and stored in the key holding unit, the encrypted contents key read from the digital medium is decoded with the decoding key by the contents key decoding means to obtain the contents key, the encrypted contents read from the digital medium is decoded by using the contents key to play the contents, and the decoding key stored in the key holding means is discarded according to the playback state of the digital media which is obtained by the playback state obtaining means.

2. The data player of claim 1, wherein the decoding key stored in the key holding means is discarded when it is confirmed that the playback state of the digital medium has become “STOP STATE”.

3. The data player of claim 1, wherein said digital medium is a DVD.

4. The data player of claim 2, wherein said digital medium is a DVD.

* * * * *